(12) United States Patent
Cho et al.

(10) Patent No.: US 11,839,980 B2
(45) Date of Patent: Dec. 12, 2023

(54) IMAGE PROCESSING APPARATUS MONITORING TARGET, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventors: Genki Cho, Kanagawa (JP); Hiroto Oka, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 322 days.

(21) Appl. No.: 17/230,426

(22) Filed: Apr. 14, 2021

(65) Prior Publication Data

US 2021/0323150 A1 Oct. 21, 2021

(30) Foreign Application Priority Data

Apr. 21, 2020 (JP) ................... 2020-075402

(51) Int. Cl.
*B25J 9/16* (2006.01)
*G06V 20/10* (2022.01)
*G06T 7/00* (2017.01)

(52) U.S. Cl.
CPC ........... *B25J 9/1653* (2013.01); *B25J 9/1697* (2013.01); *G06T 7/0004* (2013.01); *G06V 20/10* (2022.01)

(58) Field of Classification Search
CPC ...... B25J 9/1653; B25J 9/1697; B25J 9/1674; G06T 7/0004; G06T 2207/10016; G06T 2207/30164; G06V 20/10; G06V 20/50

USPC .................................................. 382/100, 141
See application file for complete search history.

(56) References Cited

U.S. PATENT DOCUMENTS

| | | | |
|---|---|---|---|
| 7,403,872 B1 * | 7/2008 | St. Onge | B07C 5/3422 |
| 2004/0162639 A1 * | 8/2004 | Watanabe | B25J 9/1697 |
| | | | 700/259 |
| 2006/0236792 A1 * | 10/2006 | Hanna | G01B 5/18 |
| | | | 73/865.8 |
| 2009/0112478 A1 * | 4/2009 | Mueller, Jr. | A61B 5/14532 |
| | | | 600/347 |
| 2018/0284733 A1 * | 10/2018 | Ueyama | G05B 19/0428 |

(Continued)

FOREIGN PATENT DOCUMENTS

| | | |
|---|---|---|
| CN | 108647557 A | 10/2018 |
| CN | 110191324 A | 8/2019 |
| JP | 2001-197483 A | 7/2001 |

(Continued)

*Primary Examiner* — Sheela C Chawan
(74) *Attorney, Agent, or Firm* — CANON U.S.A., INC. IP Division

(57) ABSTRACT

An image processing apparatus capable of analyzing a cause of an abnormality of a system efficiently. The image processing apparatus includes a monitoring unit and an analysis unit. The monitoring unit monitors a monitoring object to detect occurrence of an abnormality in the monitoring object by applying an image process to a first area in each of images of the monitoring object that are photographed at different time points. The analysis unit analyzes a cause of an abnormality detected by the monitoring unit by applying an image process to a second area that is different from the first area in an image of a time point preceding a time point at which the abnormality is detected.

20 Claims, 12 Drawing Sheets

(56) References Cited

U.S. PATENT DOCUMENTS

2021/0299872 A1* 9/2021 Wu .................. B25J 9/1697

FOREIGN PATENT DOCUMENTS

| JP | 2009-015654 | * | 1/2009 |
| JP | 2013-026678 A | | 2/2013 |
| JP | 2016-048910 A | | 4/2016 |
| JP | 2017-004258 A | | 1/2017 |

* cited by examiner

FIG. 6
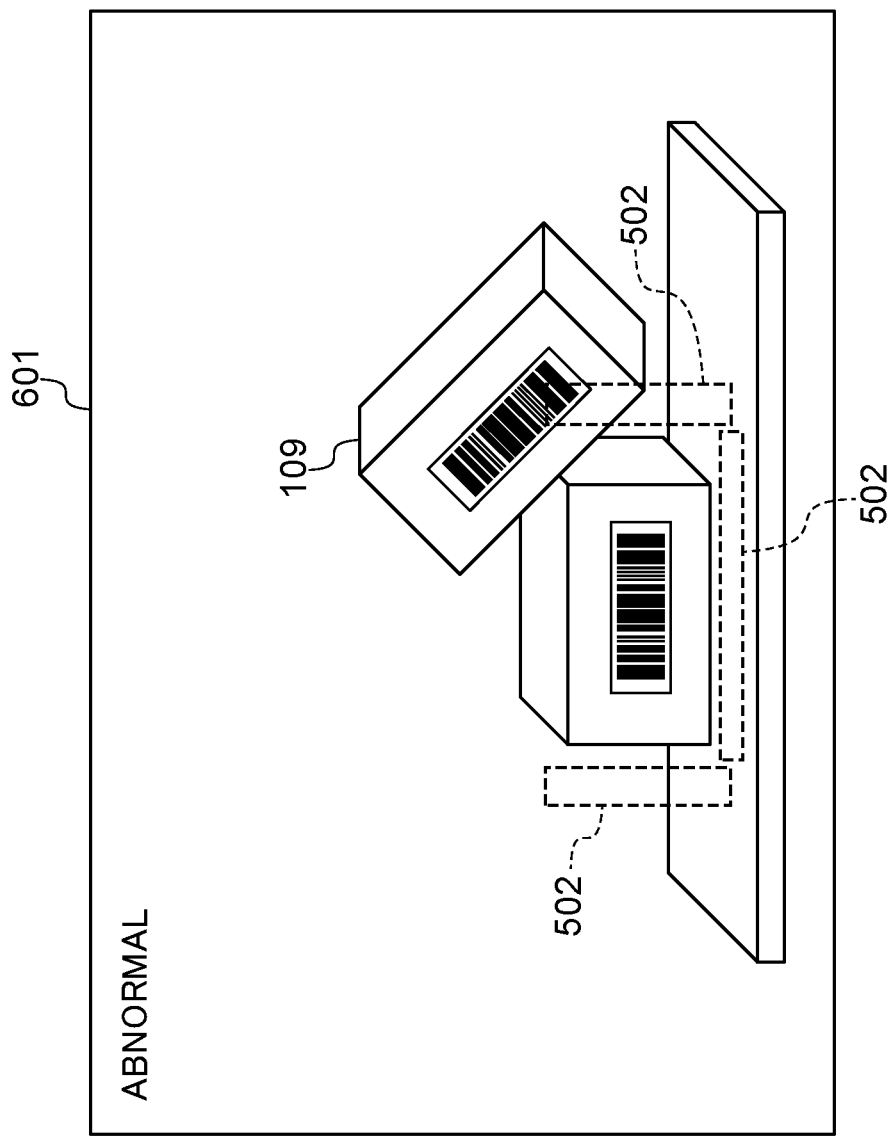
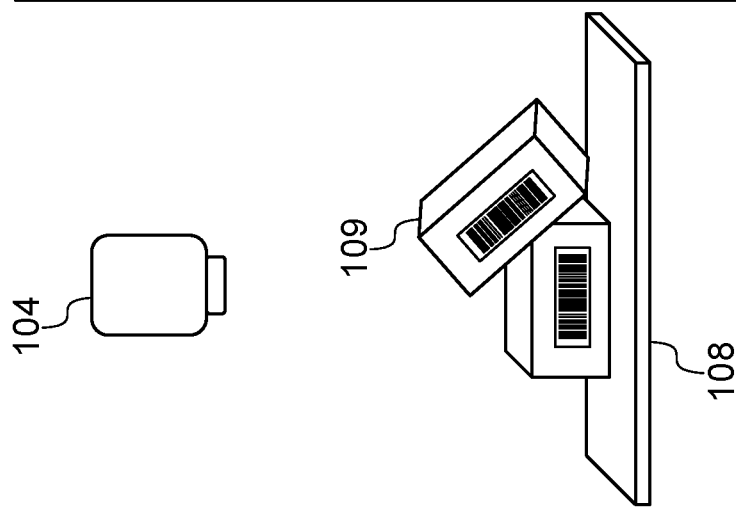

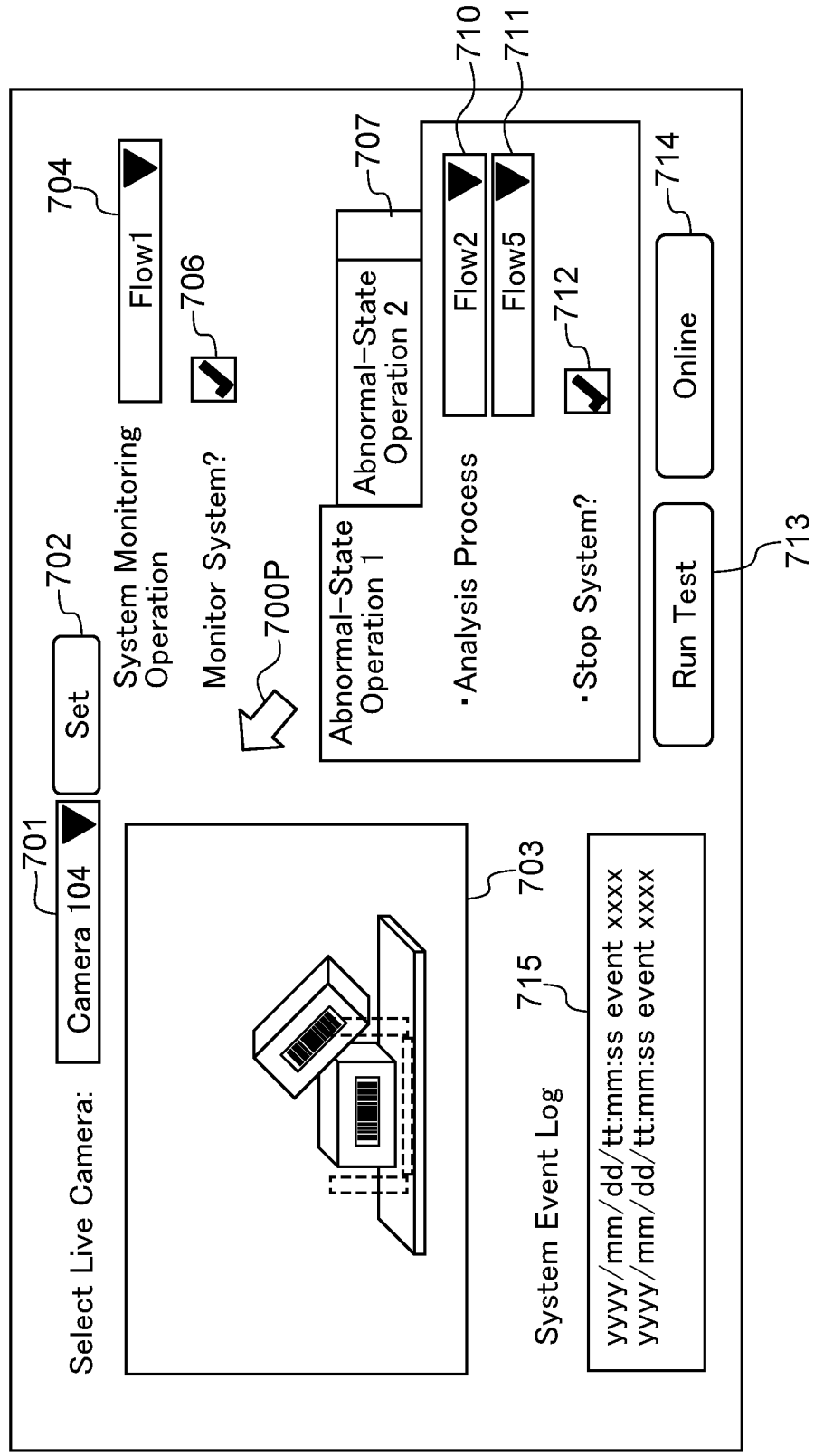

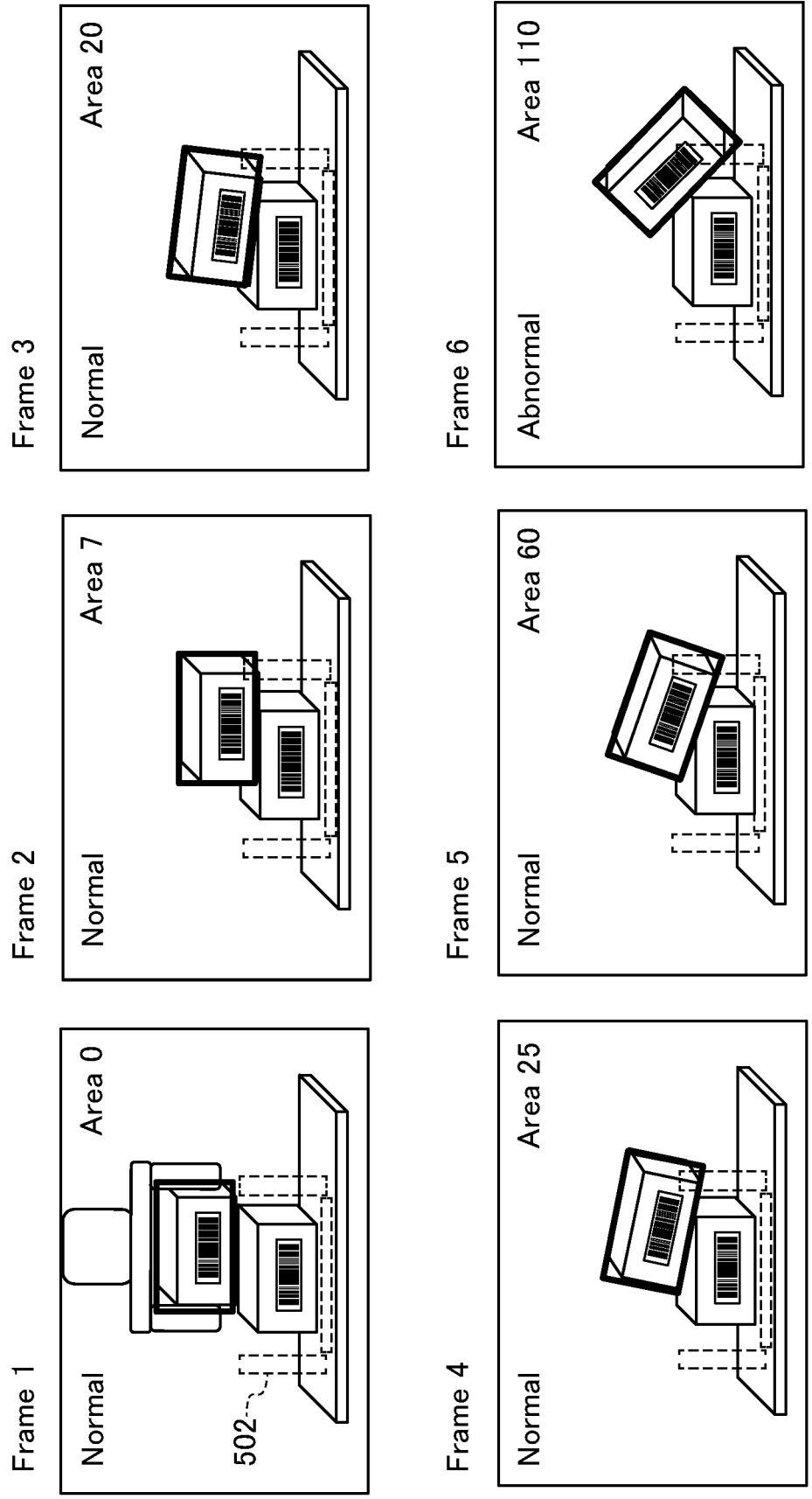

IMAGE PROCESSING APPARATUS MONITORING TARGET, CONTROL METHOD THEREFOR, AND STORAGE MEDIUM STORING CONTROL PROGRAM THEREFOR

BACKGROUND OF THE DISCLOSURE

Field of the Disclosure

The aspect of the embodiments relates to an image processing apparatus that monitors a target, a control method therefor, and a storage medium storing a control program therefor.

Description of the Related Art

There is a technique that controls robots, such as a grip device, a robot arm, and an actuator, to apply various operations to a workpiece for purpose of production of a product, check of a quality, conveyance, or the like. Moreover, there is a technique that monitors an apparatus and a work condition, measures a position of a workpiece, and inspects the workpiece by applying an image process to stored image data that is obtained by capturing the workpiece using an image pickup apparatus like a camera. Since use of the above-mentioned techniques enables to switch a control instruction for a robot device and to correct an operation without regular monitoring by visual observation, a system that performs more various desired works can be constructed.

Moreover, different processes can be applied to one piece of image data by switching a process content of the image process. The technique that switches the process content of the image process is proposed by Japanese Laid-Open Patent Publication (Kokai) No. 2017-004258 (JP 2017-004258A), for example. The technique of this publication determines a designated part in an image and executes an image process that depends on a determination result.

For example, a target area of an image process that efficiently detects an abnormality, such as collapse or falling of workpieces, in a production site is a peripheral area of a service table that serves a workpiece in many cases. Accordingly, when an abnormality is monitored in a production site, the peripheral area of the service table for a workpiece is monitored as a monitoring area. In the meantime, in order to analyze a cause of occurrence of an abnormality, such as collapse or falling of workpieces, in high accuracy, the image process is applied to a plurality of different areas as analysis areas that tend to cause troubles within an image obtained before detecting the abnormality.

Accordingly, since an image for monitoring an abnormality and an image for analyzing a cause of the abnormality are different in both the target area and time, it is difficult to monitor and analyze an abnormality appropriately by applying the image process to one of the images. In this case, since a time period needed to analyze a cause of a system trouble may become long, the operation efficiency of the system may be lowered, and the system may stop an operation depending on a status. In the meantime, if the image process is regularly applied to all the areas that are needed to analyze a cause of an occurred abnormality as targets of the image process, the load of the image processing will become high.

SUMMARY OF THE DISCLOSURE

Accordingly, an aspect of the embodiments provides an apparatus including a monitoring unit configured to monitor a monitoring object to detect occurrence of an abnormality in the monitoring object by applying an image process to a first area in each of images of the monitoring object that are photographed at different time points, and an analysis unit configured to analyze a cause of an abnormality detected by the monitoring unit by applying an image process to a second area in an image of a time point preceding a time point at which the abnormality is detected.

Further features of the disclosure will become apparent from the following description of exemplary embodiments with reference to the attached drawings.

BRIEF DESCRIPTION OF THE DRAWINGS

FIG. 6 is a view showing an example of a monitoring state where workpieces collapse in the system of FIG. 1.

FIG. 7 is a view showing an example of an operation setting screen displayed on the display device of the image processing apparatus.

FIG. 10 is a view showing a plurality of frames captured by a camera connected to the image processing apparatus and representation of abnormality detection.

DESCRIPTION OF THE EMBODIMENTS

Figure 1:
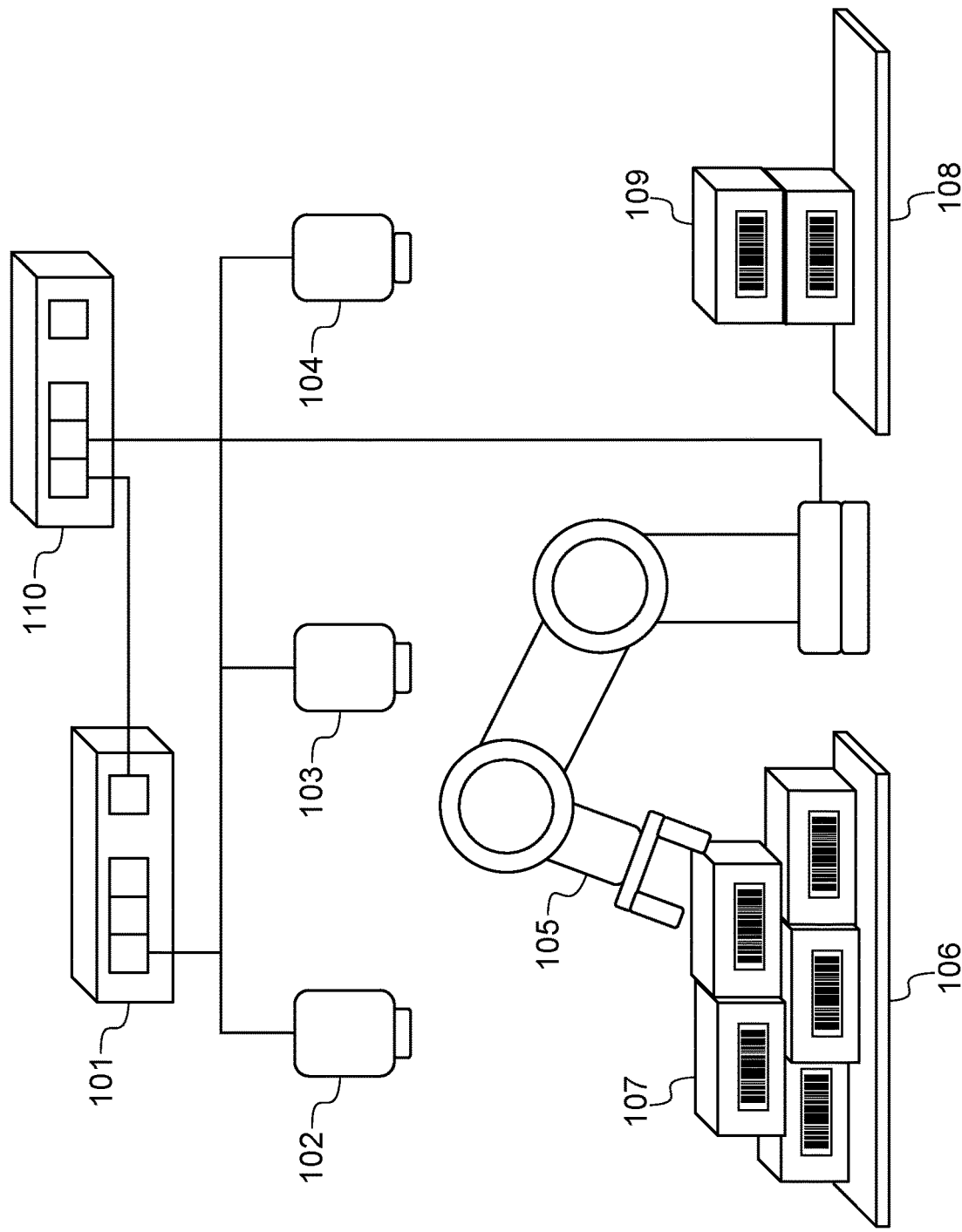
FIG. 1 is a view showing an example of an entire configuration of a system including an image processing apparatus concerning an embodiment of the disclosure.

Hereafter, embodiments according to the disclosure will be described in detail by referring to the drawings. Configurations described in the following embodiments are only examples, and the scope of the disclosure is not limited by the configurations described in the embodiments.

Hereinafter, the embodiment will be described by referring to the drawings. FIG. 1 is a view showing an example of an entire configuration of a system including an image processing apparatus concerning the embodiment of the disclosure. The system of FIG. 1 is installed to a production site, for example. The system of FIG. 1 includes the image processing apparatus 101, cameras 102, 103, and 104, a robot 105, and a system controller 110. The system controller 110 is able to transmit instructions to the image processing apparatus 101 and the robot 105. The image processing apparatus 101 and the robot 105 operate and stop according to the instructions received from the system controller 110. Thereby, the entire system is controlled.

The image processing apparatus 101 sets up and executes an image process concerning the embodiment. The image processing apparatus 101 may perform an image process different from an image process of the embodiment. The cameras 102, 103, and 104 are image pickup apparatuses that respectively photograph different areas to obtain images. The image processing apparatus 101 may be built in one of the cameras 102, 103, and 104, or may be built in the system controller 110. The image processing apparatus 101, cameras 102, 103, and 104, robot 105, and system controller 110 may be constituted as a united body. The following description assumes that the respective devices are constituted as independent bodies. Moreover, the image processing apparatus 101 may have a function of the system controller 110. In such a case, the system controller 110 is unnecessary and the image processing apparatus 101 executes the function of the system controller 110.

The robot 105 contains a robot controller that controls an operation of the robot 105. The robot 105 in FIG. 1 has an arm that employs a two-axis joint structure and an end effector that is provided at the tip of the arm. In the example in FIG. 1, the end effector is a robot hand as a grip mechanism. The arm may employ a one-axis joint structure or may employ an articulated structure having three or more axes. The end effector may be a suction mechanism that adsorbs an object. The end effector may be configured by combining a grip mechanism and a suction mechanism. Moreover, the robot 105 may be a rectangular robot etc. Each mechanism of the robot 105 operates on the basis of an instruction from an apparatus like the system controller 110.

Although the robot 105 is described as what operates on the basis of an instruction from the system controller 110, the robot 105 may operate on the basis of an instruction from an external cooperation system or may repeat a predetermined operation at a predetermined cycle. Moreover, an operation of the robot 105 may be controlled on the basis of a processing result of an image process by the image processing apparatus 101.

Each of the cameras 102, 103, and 104 picks up an image according to an arbitrary procedure and an image pickup parameter and transmits the picked-up image (image data) to the image processing apparatus 101. The image processing apparatus 101 applies an image process to the received image and outputs the result of the image process. Each of the cameras 102, 103, and 104 can change various image pickup parameters, such as pan/tilt, a zoom magnification, focus, an aperture, and a signal amplification factor. The cameras 102, 103, and 104 may change the above-mentioned various image pickup parameters on the basis of instructions from the image processing apparatus 101.

The system controller 110 transmits an instruction (a control instruction) to the robot 105. When receiving an instruction, the robot 105 changes a posture so as to grip a workpiece 107 stacked on a work table 106. After the robot 105 shifts to a predetermined posture, the cameras 102, 103, and 104 pick up images. The image processing apparatus 101 obtains the images that the cameras 102, 103, and 104 picked up.

The camera 102 mainly photographs the workpiece 107 stacked on the work table 106. The image processing apparatus 101 applies the image process to the image that the camera 102 picked up and measures the position and posture of the workpiece 107 stacked on the work table 106. The image processing apparatus 101 replies a measurement result to the system controller 110 after measuring the position and posture of the workpiece 107. The system controller 110 performs a process that corrects the gripping position of the robot 105 according to the replied measurement result. The system controller 110 transmits a processing result to the robot 105. The robot 105 corrects the gripping position on the basis of the received processing result and stacks the workpiece 107 into the service table 108 in alignment. The service table 108 may stand still or may be carried by a band conveyor etc., for example.

The camera 103 mainly photographs the robot 105. The image processing apparatus 101 is able to inspect a behavior, a position, etc. of the robot 105 by applying the image process to the image that the camera 103 picked up. The camera 104 mainly photographs workpieces 109 stacked on the service table 108. The robot 105 performs what is called pick-and-place that takes out the workpiece 107 stacked on the work table 106 and stacks it on the service table 108. When the robot 105 performs the pick-and-place, the image processing apparatus 101 may apply the image process to the image that the camera 104 picked up to determine a type of the workpiece 107 or to inspect a quality of the workpiece 107 by checking whether a defect occurs. Moreover, the image processing apparatus 101 may change the position of the workpiece 107 stacked on the service table 108 by controlling the robot 105. It should be noted that workpieces stacked on the work table 106 shall be the workpieces 107, and workpiece stacked on the service table 108 shall be the workpieces 109. The predetermined number of workpieces 109 are stacked on the service table 108 in alignment. Moreover, the image processing apparatus 101 may inspect a behavior, a position, etc. of the robot 105 by performing the image process using the pickup image of the camera 103. The workpieces 107 and 109 are examples of monitoring objects. A monitoring object may be other than a workpiece.

In industrial uses, an operation like the pick-and-place of the robot 105 shown in FIG. 1 is repeatedly performed in many cases. Then, when the image processing apparatus 101 and the cameras 102, 103, and 104 are used as a visual sense of the robot 105 and conveying machine, operations of the entire system are beforehand set to the system controller 110. Moreover, timings, parameters, compositions, etc. of photographing by the cameras 102, 103, and 104 are beforehand set up so that the image processing apparatus 101 will perform the image processes suitably. For example, some cameras are installed near the work area of the robot 105 as shown in FIG. 1, and the cameras respectively photograph predetermined workspaces. The cameras 102, 103, and 104 always or sometimes transmit the picked-up images to the image processing apparatus 101. The image processing apparatus 101 stores the images that the cameras 102, 103, and 104 picked up. Thereby, the image processing apparatus 101 stores a plurality of images that are obtained from the cameras 102, 103, and 104 at different photographing times. Moreover, the image processing apparatus 101 is able to refer to or delete each of the stored images if needed.

The robot 105 is notified of the coordinates of the work table 106 and service table 108 as teaching points. The image processing apparatus 101 performs an image obtainment and image process by using timing or time at which the end effector of the robot 105 passes a teaching point. The robot 105 and system controller 110 store the teaching points, for example. Moreover, the image processing apparatus 101 may store the image pickup parameters (an exposure, a photographing angle, a zoom magnification, etc.) corresponding to the teaching points or may store determination methods (use of fixed values, automatic exposure, auto-focusing, etc.) for the image pickup parameters. The cameras 102, 103, and 104 may pick up images using the image pickup parameters corresponding to a teaching point.

The image processing apparatus 101 stores parameters and contents of the image process. For example, the image processing apparatus 101 stores parameters and contents of an image process that is performed when the robot 105 grips the workpiece 107. Moreover, the image processing apparatus 101 stores parameters and contents of image processes that are performed when the robot 105 grips the workpiece 107 and when the robot 105 lifts up the workpiece 107. Moreover, the image processing apparatus 101 stores parameters and contents of an image process that is performed while the robot 105 transports the workpiece 107 from the work table 106 to an upper space of the service table 108. Furthermore, the image processing apparatus 101 stores parameters and contents of an image process that is performed when checking empty status of the service table 108 and occurrence status of an abnormality like falling of a workpiece in operations.

Figure 2:
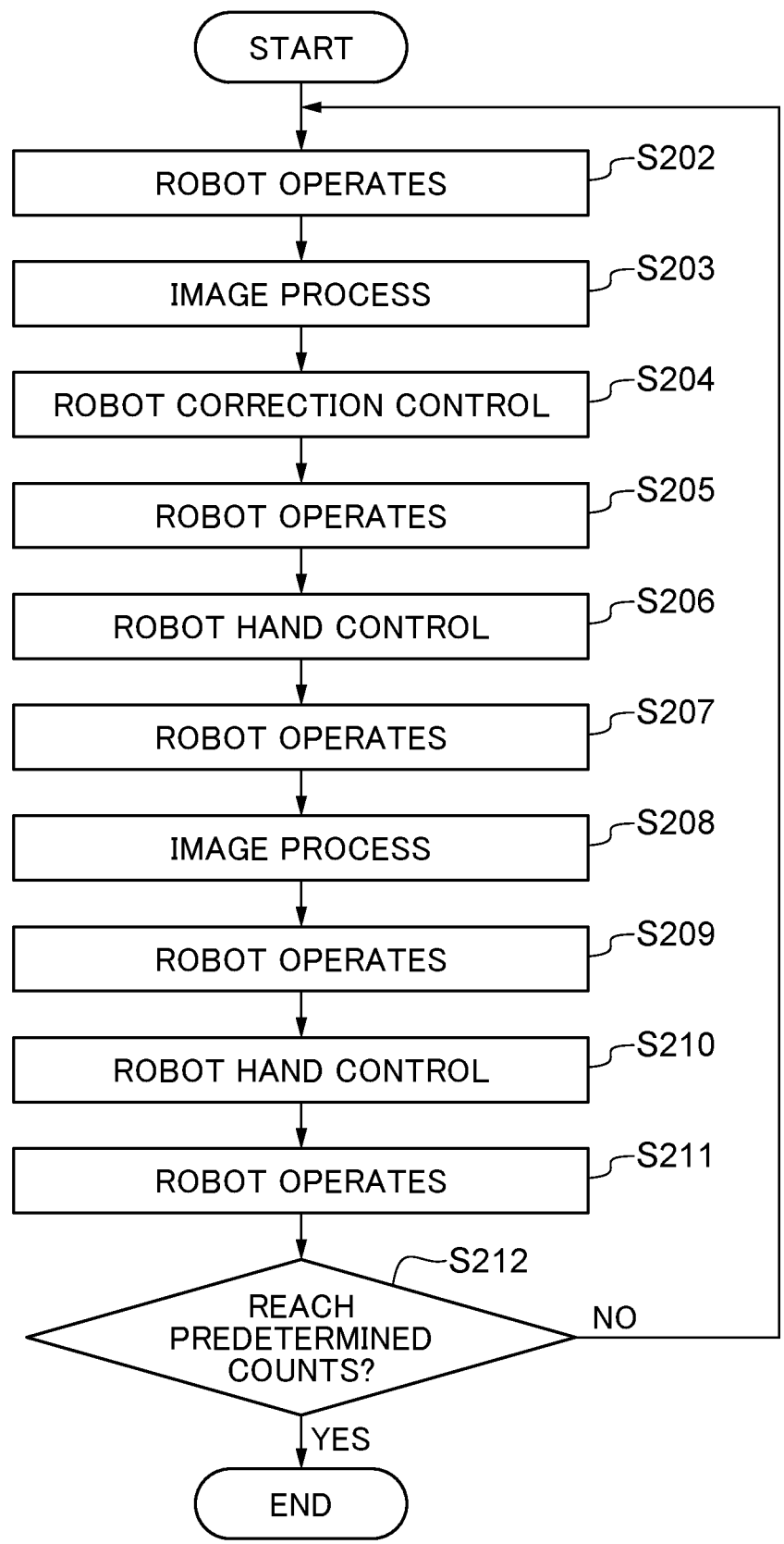
FIG. 2 is a flowchart showing a flow of a process of the entire system of FIG. 1.

FIG. 2 is a flowchart showing a flow of a process of the entire system of FIG. 1. The system concerning the embodiment operates according to the flowchart that a user creates using the image processing apparatus 101. In the meantime, the system concerning the embodiment may operate according to a flowchart that a user creates using a predetermined apparatus other than the image processing apparatus 101. Moreover, the operation of the system concerning the embodiment may be achieved when a user selects a packaging function, which contains combined flowcharts that are beforehand prepared in fixed forms depending on their functions or purposes, on a GUI (graphical user interface). Furthermore, the operation of the system concerning the embodiment may be achieved by adjusting parameters.

The flowchart of FIG. 2 shows a series of flow executed until the robot stacks the workpiece 107 on the service table 108 in an aligned state after picking out the workpiece 107 from the work table 106. When the operation of the system starts, the cameras 102, 103, and 104 start image pickup operations. The cameras 102, 103, and 104 always or sometimes transmit picked-up images to the image processing apparatus 101. The image processing apparatus 101 stores the received images. In S202, the system controller 110 gives an instruction to the robot 105 so as to move the robot hand to the upper space of the work table 106, and the robot 105 operates on the basis of the received instruction. At this time, the robot 105 moves the tip robot hand to a position at which the workpiece 107 can be gripped, for example.

Next, the system controller 110 instructs the image processing apparatus 101 to perform an image process. In S203, the image processing apparatus 101 applies the image process to the images obtained from the cameras 102, 103, and 104 according to the instruction. The image processing apparatus 101 determines whether the workpiece 107 is stacked on the work table 106 and measures a position and phase of the workpiece 107 on the basis of the image obtained from the camera 102. Moreover, the image processing apparatus 101 determines whether the workpiece 109 is stacked on the service table 108 and measures a position and phase of the workpiece 109 on the basis of the image obtained from the camera 104. The image processing apparatus 101 transmits the measurement results to the system controller 110. Thereby, the system controller 110 is able to detect the occurrence status of an abnormality near the work table 106 or the service table 108.

In S204, the system controller 110 performs correction control of the robot 105 on the basis of the results of the image process measured in S203. At this time, the system controller 110 moves the robot hand to an upper space of the workpiece 107 and controls rotation of the robot hand so as to restrict an operation of the robot 105. Moreover, the system controller 110 may determine the status of the workpiece 107 or the work table 106 and may instruct the robot 105 to change an operation speed or to stop the system according to the determination result.

In S205, the robot 105 moves the robot hand to a position at which the workpiece 107 can be gripped on the basis of the instruction from the system controller 110. Specifically, the robot hand is moved to an upper position (right above position) of the workpiece 107. In S206, the robot 105 controls opening and closing of the robot hand as the end effector on the basis of the instruction received from the system controller 110 to grip (pick) the workpiece 107.

Next, in S207, the robot 105 moves the robot hand so that the workpiece 107 will be located above the service table 108 on the basis of the instruction from the system controller 110. By S208, the image processing apparatus 101 applies the image process to the image obtained from the camera 104 on the basis of the instruction from the system controller 110 and measures the position and posture of the service table 108. Then, the image processing apparatus 101 calculates information about the position of the service table 108 on which the workpiece 107 will be stacked and transmits the calculation result to the system controller 110. In S209, the robot 105 moves the robot hand so that the workpiece 109 can be stacked at height of a service position on the service table 108 on the basis of the instruction from the system controller 110. At this time, the system controller 110 may determine the service position on the basis of the number of repetitions of the pick-and-place and the number of stacked workpieces obtained from the exterior.

In S210, the robot 105 sets (places) the workpiece 109 on the basis of the instruction from the system controller 110. Thereby, the workpiece 109 is stacked on the service table 108. In S211, the robot 105 moves the robot hand to the upper space of the service table 108 on the basis of the instruction from the system controller 110. In S212, the system controller 110 determines whether the number of times of the operations of the robot 105 reaches predetermined counts. When determining to be NO in S212, the system controller 110 returns the flow to S202. In the meantime, when determining to be YES in S212, the system controller 110 finishes the process of FIG. 2. The predetermined number can be set arbitrarily.

As mentioned above, the cameras 102, 103, and 104 and image processing apparatus 101 are used as the visual sense of the robot 105 and also used to monitor the work condition of the system. For example, the cameras 102, 103, and 104 and image processing apparatus 101 are able to monitor whether collapse of the workpiece 107 stacked on the work table 106 or the workpiece 109 stacked on the service table 108 occurs. Moreover, the cameras 102, 103, and 104 and image processing apparatus 101 are able to regularly monitor whether an abnormality, which will obstruct the operations of the robot 105, occurs near the work area (for example, the work table 106 and service table 108) of the robot 105.

Figure 3:
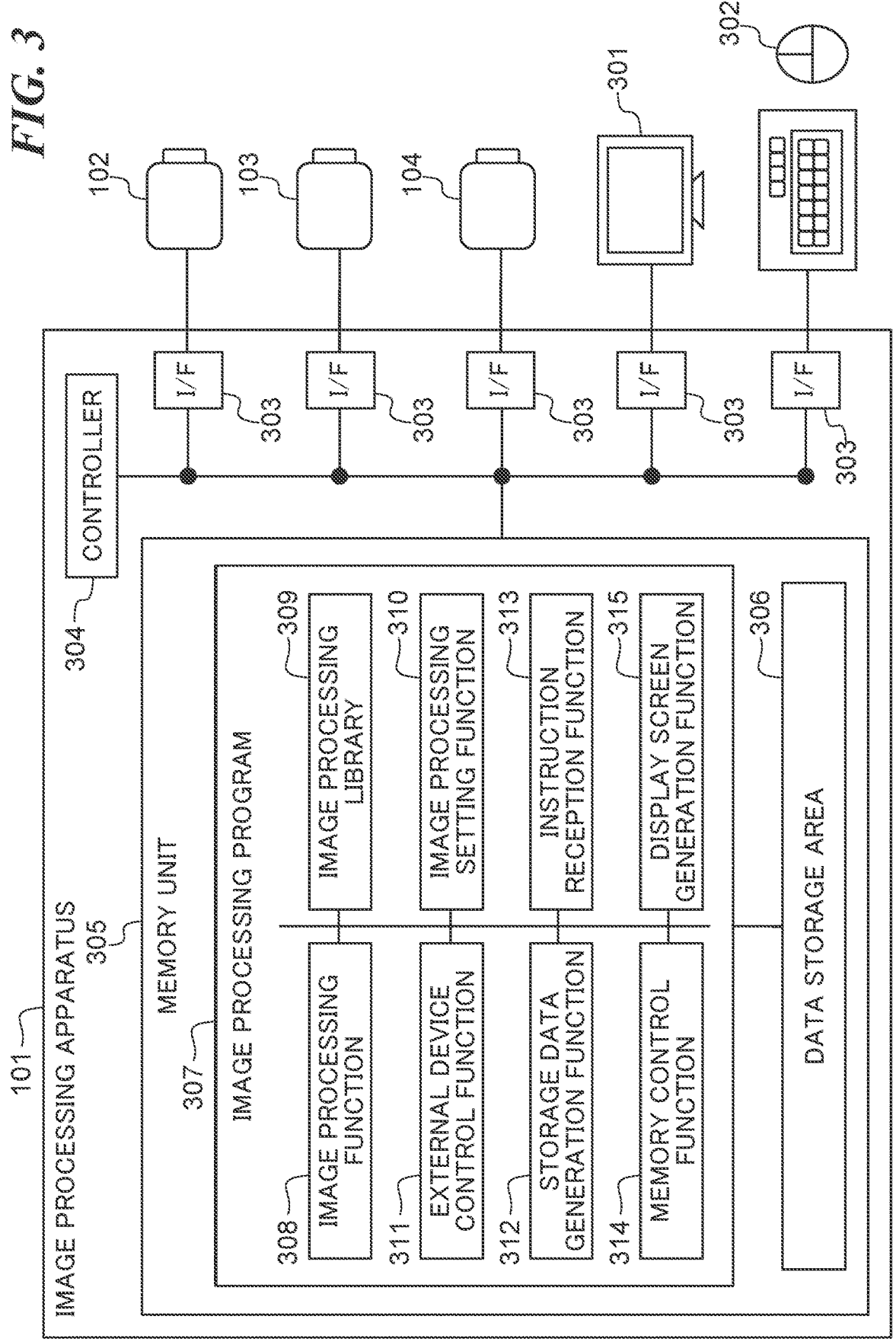
FIG. 3 is a block diagram schematically showing the image processing apparatus shown in FIG. 1.

Next, the image processing apparatus 101 will be described. FIG. 3 is a block diagram showing a configuration example of the image processing apparatus 101. The image processing apparatus 101 is connected to the cameras 102, 103, and 104, a display device 301, and an input device 302. The display device 301 is a cathode-ray tube or a liquid crystal panel that displays an image. The input device 302 includes a keyboard, mouse, and touch panel provided on the display device 301. The input device 302 may also include an input operation controller and a gesture input apparatus. The display device 301 can display the GUI screen that can be operated with the touch panel. That is, the display device 301 and a part of the input devices 302 constitute a united touch panel display unit. Moreover, the display device 301 and input device 302 may be built in the image processing apparatus 101.

In the example of FIG. 3, the image processing apparatus 101 has interfaces 303 that respectively correspond to the cameras 102, 103, and 104, display device 301, and input device 302. An interface is indicated as "I/F" in FIG. 3. Each interface 303 may conform to standard suitable for communication with each device. For example, the interfaces 303 are constituted by a network interface, serial communication interface, etc.

The image processing apparatus 101 has a controller 304 and a memory unit 305. The interfaces 303, controller 304, and memory unit 305 are mutually connected through an internal bus. The controller 304 controls the entire image processing apparatus 101. Moreover, the controller 304 functions also as a calculation unit that performs calculation of an image process. The controller 304 has a CPU and an image processing processor, for example. The memory unit 305 may employ a ROM, a RAM, a nonvolatile memory device like an EEPROM, or an external storage device (an HDD or a storage unit constituted by a semiconductor device), for example. The memory unit 305 may be constituted by a file area or a virtual storage area of each storage unit. The process of this embodiment is achieved by running a program stored in the memory unit 305 by the CPU of the controller 304.

A data storage area 306 is constituted by a RAM area in the memory unit 305, a file area or a virtual storage area of an external storage device, or the like. The data storage area 306 can store processing data temporarily and stores setting parameters of an image process temporarily. Moreover, the memory unit 305 stores an image processing program 307 for performing an image process of the embodiment. The image processing program 307 is software that changes settings of the image process according to various operations performed with the input device 302 and executes the image process. The information about the setting change of the image process can be stored in the memory unit 305 or the data storage area 306 and can also be deleted.

The image processing program 307 is constituted by software modules that achieve various kinds of functions. An image processing function 308 is a main body of the image processing program 307 that achieves the image process. The image processing function 308 can use an image processing library 309. The image processing library 309 is implemented as a library linked statically or dynamically, for example. An image processing setting function 310 determines a behavior of the process that will be achieved by the image processing program 307 according to various operations set from the input device 302.

Moreover, the image processing program 307 includes functions of various I/O (input and output) routines. An external device control function 311 controls an external device. The storage data generation function 312 generates storage data. An instruction reception function 313 receives a content of an operation performed using the input device 302 and recognizes the operation content. A memory control function 314 temporarily stores data to a RAM area of the memory unit 305 or a cache area of the controller 304. A display screen generation function 315 generates a display screen displayed on the display device 301.

Each function of the image processing program 307 is stored in the memory unit 305 in the form of an application (utility) program or in the form of a subroutine constituted as a library that is linked statically or dynamically. Thereby, each function of the image processing program 307 is implemented. The controller 304 that runs the image processing program 307 corresponds to a monitor unit, an analysis unit, and a display control unit.

The image processing apparatus 101 controls the cameras 102, 103, and 104 and performs the image process, etc. by running the image processing program 307 by the controller 304. Moreover, the image processing apparatus 101 receives a user operation performed using the input device 302, and receives an instruction from an external control device, such as the system controller 110. The controller 304 calls a function and library of the image processing program 307 according to the user operation or the instruction from the external control device and performs a calculation process. Then, the image processing apparatus 101 transmits the result of the image process to the system controller 110. Moreover, the image processing apparatus 101 is able to accumulate the results of the image process in an external storage or the memory unit 305 as a log. Moreover, the image processing setting function 310 of the image processing apparatus 101 may generate a screen by superimposing the result of the image process over a screen layout and may display the generated screen on the display device 301.

Figure 4:
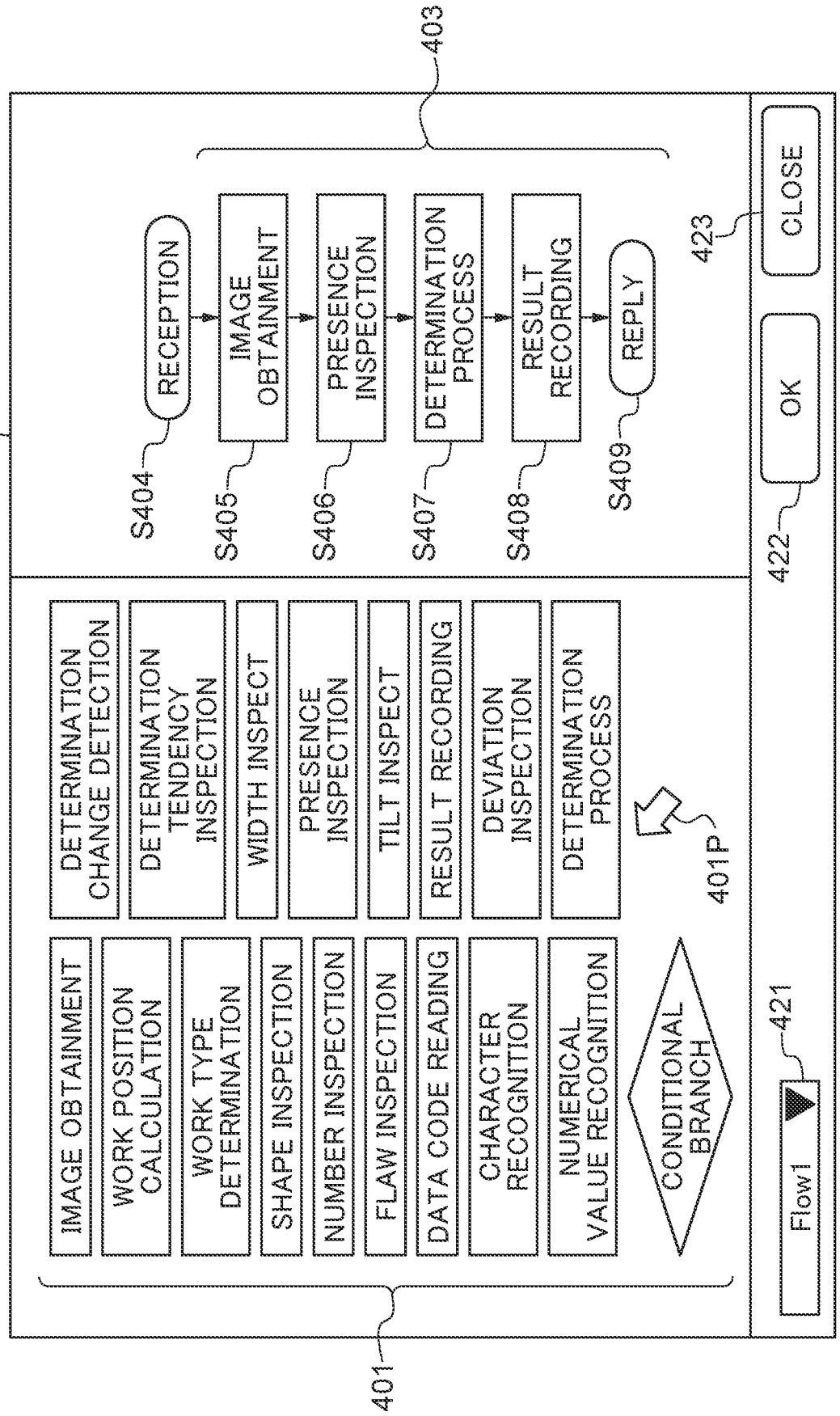
FIG. 4 is a view showing an example of a flowchart generation screen displayed on a display device of the image processing apparatus.

Next, a flowchart creation screen for construction of the image processing program 307 will be described. FIG. 4 is a view showing an example of the flowchart creation screen. The flowchart creation screen corresponds to a first screen. The processes in S203 and S208 in FIG. 2 are achieved by running the image processing program 307, which is constructed by a flowchart created on the flowchart creation screen, by the controller 304. The flowchart creation screen is displayed on the display device 301. On the flowchart creation screen, a user freely sets up contents of the process that the image processing program 307 performs by using the input device 302. Moreover, the image processing program 307 may be constructed by an apparatus other than the image processing apparatus 101. In this case, the image processing apparatus 101 obtains the image processing program 307 from the other apparatus and stores it to the memory unit 305. Moreover, the image processing program 307 may be achieved when a user selects a packaging function, which contains combined flowcharts that are beforehand prepared in fixed forms depending on their functions or purposes, on the GUI. Furthermore, the image processing program 307 may be achieved by adjusting parameters.

As shown in FIG. 4, the flowchart creation screen is divided into a parts list area 401 and flowchart area 402 mainly. In the parts list area 401, a list of a plurality of processing parts that indicate contents of the respective processes is displayed. A processing part corresponds to a processing unit. The processing parts are not limited to the example of FIG. 4. A user operates the mouse of the input device 302 so as to select processing parts from the parts list area 401 and to connect the selected processing parts with a line in the flowchart area 402. For example, the user operates a mouse pointer 400P using the mouse so as to drag a processing part in the parts list area 401 and to drop it in the flow chart area 402. Then, the user operates so as to connect the processing parts in the flowchart area 402 with a line. The controller 304 is able to create a flowchart on the basis of the user operations.

The flowchart in the flowchart area 402 in FIG. 4 will be described. The flowchart in the flowchart area 402 is created by the user on the GUI. "RECEPTION" of S404 is a process that the image processing apparatus 101 receives an instruction of an image process from the system controller 110. The processing part of S404 may be beforehand set in the flowchart area 402 as an initial value. The instruction may designate a flowchart of an image process, parameters for executing an image process, and the time of image data to be used. "IMAGE OBTAINMENT" of S405 is a process for obtaining and storing images from the cameras 102, 103, and 104. The image data obtained by the process of S405 may be the newest image data among the image data stored in the memory unit 305 and external storage device or may be image data at the time (measurement time) designated from the system controller 110.

"PRESENCE INSPECTION" of S406 is a process for inspecting presence or absence of a workpiece in the obtained image data. A method of the workpiece presence inspection is provided by the image processing library 309. For example, the workpiece presence inspection may be performed on the basis of the area of a workpiece extracted using luminance information and color information. Moreover, the workpiece presence inspection may be performed by pattern matching that uses shape facility information, such as shade distribution or luminance gradient. Furthermore, the workpiece presence inspection may be performed by extracting pixels of which luminance gradients are equal to or more than a predetermined value as edge information and by using positions, centroids, or tilts of the extracted edges.

"DETERMINATION PROCESS" of S407 is a process for determining whether the processing result of the "PRESENCE INSPECTION" of S406 falls within a range of a threshold of the flowchart created. For example, the area of the workpiece shall be extracted by the process of the "PRESENCE INSPECTION" of S406. In this case, the process of S407 determines a degree of area (square measure) of the extracted workpiece in a predetermined area. In this embodiment, occurrence of an abnormality is detected on the basis of the processing result of "DETERMINATION PROCESS" of S407. "RESULT RECORDING" of S408 is a process for recording the execution results of the processes of S405 and S406 and the processing result of S407.

For example, when the process of S408 is executed, start time of the process of S404 or contents of a predetermined execution option may be stored. Moreover, when the process of S408 is executed, the image data obtained by the process of S405 is stored, and the photographing time, image size, and image pickup parameter of the image data concerned may be stored. Moreover, when the process of S408 is executed, the area, shade information, gradient information, and color information about the workpiece extracted by the process of S406 may be stored. Furthermore, when the process of S408 is executed, the determination result of the process of S407 may be stored. The above various data are stored in the data storage area 306, the RAM area, the cache area of the controller 304, or the like.

"REPLY" of S409 is a process for outputting various kinds of data stored by executing the process of S408 and for finishing the process of the flowchart. The processing part of S409 may be beforehand set as the flowchart area 402 as an initial value. When the process of S409 is executed, a process that outputs the processing result to the system controller 110, a process that stores the processing result to the data storage area 306, and a process that displays the processing result on the display device 301 may be executed.

The various data stored in the data storage area 306, the RAM area of the memory unit 305, and the cache area of the controller 304 can be referred to and can be deleted.

Accordingly, the user is able to create a desired flowchart by selecting desired processing parts from the parts list area 401 and adding it to the flowchart area 402. In the example of FIG. 4, the flowchart 403 that consists of the processing parts S404 through S409 in the flowchart area 402 is generated. That is, the image processing apparatus 101 generates the image processing program 307 on the basis of the flowchart created by the user operation. This improves the degree of freedom of design of the image processing program 307.

In the description, a processing part shall be selected from among the processing parts of the flowchart 403 in FIG. 403 by a user operation. A processing part may be selected by double click of the mouse of the input device 302, for example. When receiving an operation that selects a processing part, the controller 304 changes the screen displayed on the display device 301 to a detailed setting screen for setting a detailed process of the processing part selected. The details of the detailed setting screen will be mentioned later.

The flowchart 403 in FIG. 4 is an example of the flowchart created on the basis of the user operation. A flowchart using the processing part of "CONDITIONAL BRANCH" may be created. In this case, the created flowchart selects a process that will be executed according to a condition from among processes having different contents. The flowchart creation screen in FIG. 4 includes a list box 421, an OK button 422, and a close button 423.

The list box 421 is provided in order to add a new flowchart or to select a flowchart that has already created. When adding a new flowchart, the user is able to input a name of the new flowchart in the list box 421. In the example of FIG. 4, the user is able to add or select a flowchart in a pull down menu form by a user operation to the list box 421. In this embodiment, a plurality of flowcharts are created on the flowchart creation screen. Names that specify the flowcharts are associated with the respective created flowcharts. For example, the name "Flow1" corresponds to the flowchart 403 in FIG. 4.

The OK button 422 is used to fix the flowchart currently displayed on the flowchart area 402. When receiving a press operation of the OK button 422, the controller 304 generate a program corresponding to the flowchart currently displayed on the flowchart area 402. As mentioned above, a plurality of flowcharts that are mutually different are created according to user operations on the flowchart creation screen. The controller 304 generates a plurality of programs corresponding to the plurality of created flowcharts. The close button 410 is used to close the flowchart creation screen.

As mentioned above, the cameras 102, 103, and 104 and image processing apparatus 101 can be used to monitor the work condition of the system. For example, the cameras 102, 103, and 104 and image processing apparatus 101 are able to monitor whether collapse of the workpiece 107 stacked on the work table 106 or the workpiece 109 stacked on the service table 108 occurs. Moreover, the cameras 102, 103, and 104 and image processing apparatus 101 monitor whether the operation of the robot 105 is deviated from a predetermined operation.

Figure 5:
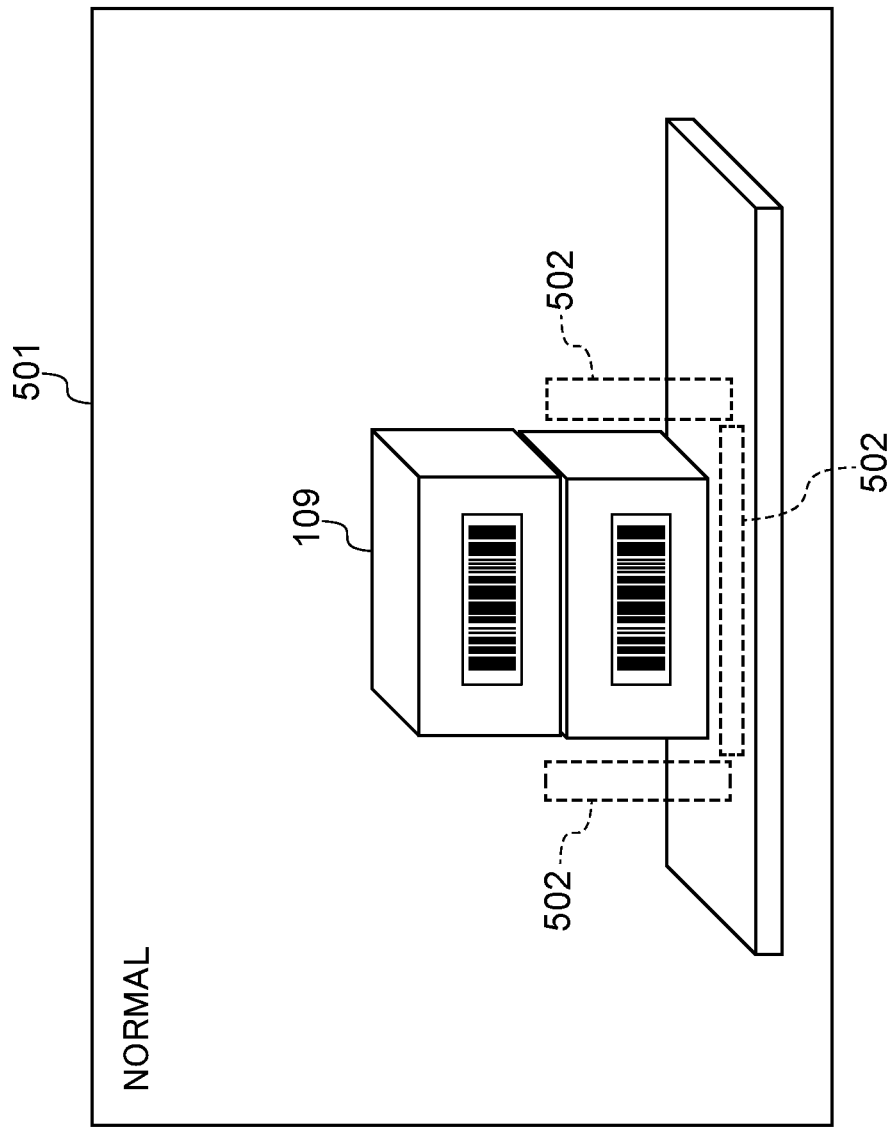
FIG. 5 is a view showing an example of a monitoring state where workpieces are normally stacked in the system of FIG. 1.

Hereinafter, the regular monitoring of the system and the analysis process of a cause of an occurred abnormality by the image processing program 307 will be described. FIG. 5 is a view showing an example of a monitoring state where the workpieces 109 are normally stacked on the service table 108. The camera 104 photographs the workpieces 109 stacked on the service table 108. Monitoring areas 502 are indicated by broken lines in image data 501 that the camera 104 photographed. The monitoring areas 502 are examples of first areas. In the description, the image processing apparatus 101 shall always obtain the image data from the cameras 102, 103, and 104. The controller 304 of the image processing apparatus 101 determines whether the workpieces 109 are stably stacked by determining whether a workpiece 109 enters into a monitoring area 502 using the shade information, outline extraction, pattern matching, etc.

The controller 304 calculates the position of the workpiece by applying the image process to the obtained image data as with the process of S406 and determines whether the calculated position of the workpiece enters into a monitoring area 502. When determining that the calculated position of the workpiece enters into a monitoring area 502, the controller 304 detects that an abnormality occurs.

Moreover, the controller 304 may change the size of the monitoring areas 502 depending on the photographing times of the cameras 102, 103, and 104. For example, a case where the system is working all day is assumed. It is assumed that many operators are engaged in operations around the system in the daytime. Accordingly, an operator may enter into a monitoring area 502. In this case, an abnormality is erroneously detected. Accordingly, the controller 304 may set the monitoring areas 502 to be narrower than predetermined areas in the daytime (for example, a period during which operators are engaged in operations). In the meantime, there is little chance of the erroneous detection of the abnormality because an operator hardly enters into the monitoring areas 502 in the nighttime. Accordingly, the controller 304 may set the monitoring areas 502 to be larger than the predetermined areas in the nighttime (for example, a period other than the period during which operators are engaged in operations). The controller 304 may change the image processing parameters, such as an abnormality detection threshold and an outline detection sensitivity, depending on the photographing time. For example, since it is assumed that environmental variation is large in the daytime, the controller 304 may reduce superfluous detection by raising the detection threshold to lower the sensitivity of the abnormality detection. Moreover, since it is assumed that the environmental variation is small in the night time, the controller 304 may raise the sensitivity of the abnormality detection by lowering the abnormality detection threshold.

FIG. 6 is a view showing an example of a monitoring state where the workpieces stacked on the service table 108 collapse. In the example of FIG. 6, the workpiece 109 of the second step from the bottom falls by collapse and enters into the monitoring area 502. At this time, the controller 304 is able to detect that the workpiece 109 enters into the monitoring area 502 by applying the image process to the image data picked up by the camera 104 as shown in FIG. 6. That is, the controller 304 is able to detect a system abnormality (a workpiece stacking abnormality). When detecting the system abnormality, the controller 304 performs an image process (analysis process) for analyzing the cause of the abnormality.

Next, the analysis process that monitors an abnormality and analyzes a cause of an abnormality will be described. FIG. 7 is a view showing an example of an operation setting screen for setting operations in occurrence of an abnormality. The screen of FIG. 7 corresponds to a second screen. In the screen (GUI) of FIG. 7, a list box 701 is a selection item for selecting which of the cameras 102, 103, and 104 is used for displaying a live image. In the example of FIG. 7, the list box 701 that has a pull down menu form is used to select a camera of which image data is displayed as a live image. For example, the user is able to select one of the cameras in the list box 701 and any camera can be selected from the list box 701 with a mouse pointer 700P by operating the mouse of the input device 302. A setting button 702 is used to display an image of the camera selected in the list box 701 on an image display area 703. In the example of FIG. 7, the live image of the camera 104 is displayed on the image display area 703.

A list box 704 is a setting item for setting up a flowchart (first flowchart) of a monitoring image process that is periodically executed by the system. As mentioned above, the plurality of flowcharts are created on the flowchart creation screen of FIG. 4 and the names are stored while associating with the respective flowcharts. The list box 704 is a selection item for selecting a flowchart for monitoring occurrence of an abnormality in the system. For example, the user is able to select a desired flowchart created from a pull-down menu of the list box 704 using the mouse. FIG. 7 shows an example where "Flow1" is selected as the flowchart for monitoring occurrence of an abnormality. A check box 706 is provided in order to establish whether the monitoring of the system is performed.

A tab 707 is a setting item for setting an operation of the analysis process of a time of detecting an abnormality. The tab 707 can be added and deleted. For example, when the operation of adding or deleting the tab 707 is performed, the controller 304 controls to add or delete the tab 707. When there are two or more tabs 707, different operations of a time of detecting an abnormality can be set to the respective tabs. There are the two tabs 707 in the example of FIG. 7.

A tab of "Abnormal-State Operation 1" among the tabs 707 includes a first list box 710, second list box 711, and check box 712. A tab of "Abnormal-State Operation 2" may be configured similarly or differently. The number of tabs and the number of list boxes are arbitrary.

Each of the first list box 710 and second list box 711 is provided to select a flowchart (second flowchart) of an analysis process executed when an abnormality is detected. For example, the user is able to select a desired flowchart from among the created flowcharts in each of the first list box 710 and the second list box 711 in the pull-down menu format using the mouse. In the example of FIG. 7, the created flowcharts "Flow2" and "Flow5" are selected. Accordingly, the first flowchart about the monitoring image process and the second flowcharts about the image processes for analyzing a cause of an abnormality are settable on the single screen (GUI in FIG. 7) while associating them mutually. It should be noted that the flowchart Flow2 includes a process that inspects a type of a workpiece and that the flowchart Flow5 includes a process that inspects a tilt of a workpiece as mentioned later.

When performing the analysis process, the controller 304 runs the image processing program 307 on the basis of the flowcharts of "Flow2" and "Flow5". The controller 304 may perform "Flow2" and "Flow5" parallelly or sequentially. The check box 712 is provided in order to establish whether the system is stopped at a time of detecting an abnormality. When a check is contained in the check box 712, the process is accompanied by the system stop. When a check is not contained in the check box 712, the process is not accompanied by the system stop.

The controller 304 may change the priority of executions of "Flow2" and "Flow5" and may switch the tabs according to a degree of an abnormality. For example, the check shall be contained in the check box 712 in the tab of "Abnormal- State Operation 1" among the tabs 707 and the check shall not be contained in the check box 712 in the tab of "Abnormal-State Operation 2". In this case, when the degree of the abnormality detected by the process of "Flow1" is smaller than a predetermined degree, the controller 304 executes the process of "Abnormal-State Operation 2" that is not accompanied by the system stop. In this case, the system is able to maintain the working state.

Moreover, the controller 304 shall extract the area of the workpiece in the image data according to the flowchart "Flow1". At this time, when the area of the workpiece that enters into the monitoring area 502 is smaller than a predetermined area and when the amount of change of the area is changing in a range lower than a predetermined value, it is estimated that the stacking state of the workpiece is stable. In this case, since a possibility that the workpiece tilts is low, the controller 304 executes the process of the flowchart "Flow2" that inspects the type of the workpiece as the analysis process. In the meantime, when the area of the workpiece that enters into the monitoring area 502 is not smaller than the predetermined area and when the amount of change of the area is changing in a range more than the predetermined value, the controller 304 determines that the workpiece collapses. In this case, the controller 304 executes the process of the flowchart "Flow5" that inspects tilt of a workpiece as the analysis process. That is, the controller 304 sets which of the process of the flowchart "Flow2" and the process of the flowchart "Flow5" is executed according to the result of the execution of the process of the flowchart "Flow1".

A test running button 713 in the GUI of FIG. 7 is used to run the system monitoring operation and the operation of the time of abnormality occurrence as a test. An online button 714 is used to switch to a state that waits starting the system monitoring operation and the operation of the time of abnormality occurrence until receiving an instruction from an external device online. A log display area 715 is used to display the information about phenomena, such as abnormalities that occurred in the system during the system monitoring operation, as a log.

Figures 8A, 8B, 8C:
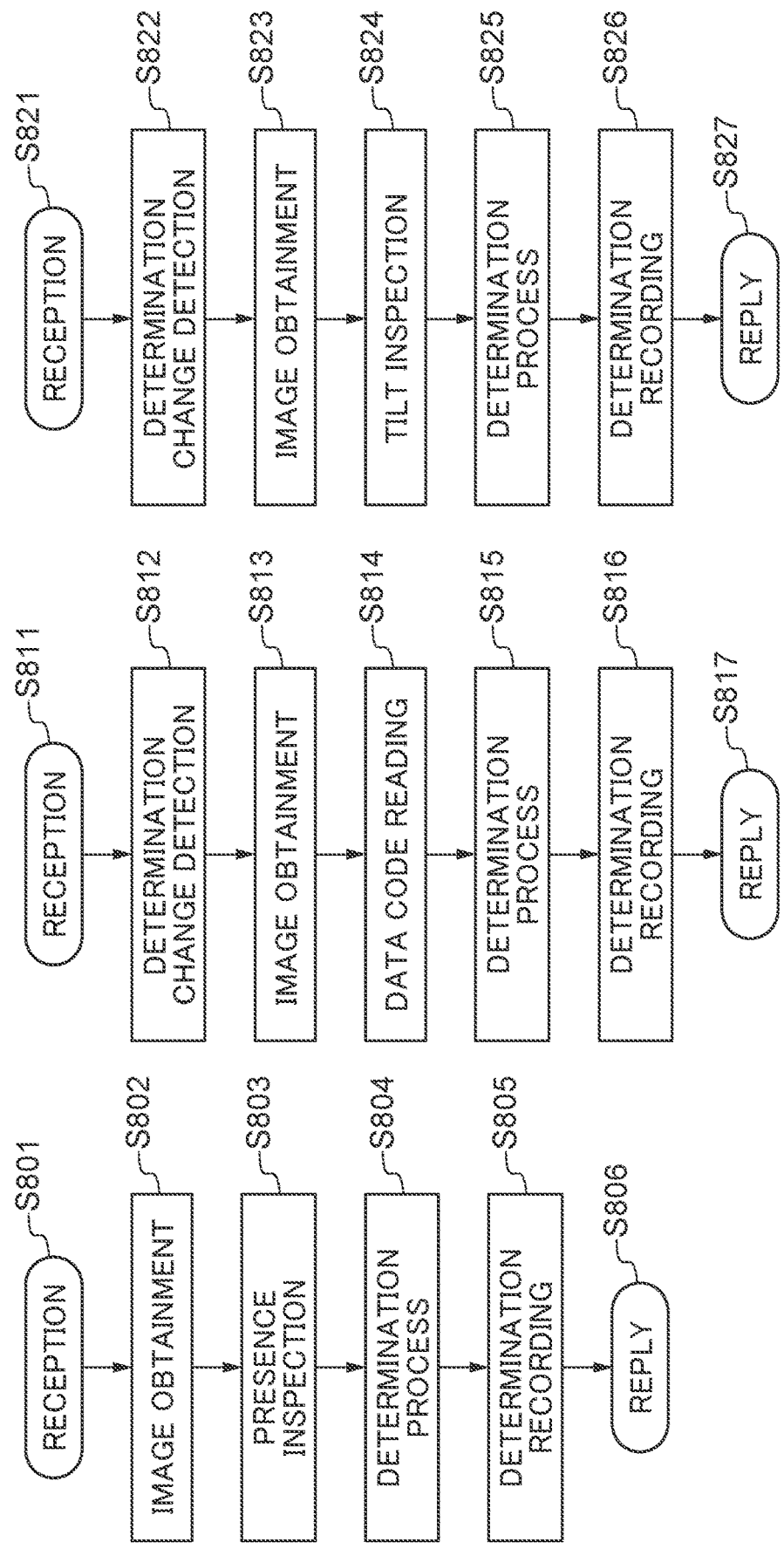
FIG. 8A, FIG. 8B, and FIG. 8C are views showing examples of created flowcharts.

FIG. 8A, FIG. 8B, and FIG. 8C are views showing examples of created flowcharts. Three flowcharts "Flow1", "Flow2", and "Flow5" that are selected in FIG. 7 are respectively shown in FIG. 8A, FIG. 8B, and FIG. 8C. The flowchart "Flow1" of FIG. 8A describes the process for monitoring the system and detecting abnormalities. The processes of S801 through S806 are respectively identical to the processes of S404 through S409 shown in FIG. 4.

The flowchart "Flow2" of FIG. 8B describes the analysis process that inspects the type of a workpiece. A process "RECEPTION" of S811 is identical to the process of S404 in FIG. 4. The flowchart "Flow2" describes the process that is received of the time of abnormality occurrence. Accordingly, the controller 304 may output the information, such as the numerical information, position information, and determination time, as the image processing results based on the flowchart "Flow1" in the former stage when the process of S811 of the flowchart "Flow2" is executed. Moreover, the controller 304 may output the pieces of information to the system controller 110, for example.

A process of S812 corresponds to "DETERMINATION CHANGE DETECTION" included in the parts list area 401 in FIG. 4. At this time, the controller 304 recognizes the time when a predetermined determination value varies beyond a certain amount as the time of occurrence of the abnormality in the system. Alternatively, the controller 304 may recognize the time when the predetermined determination value begins to vary as the time of occurrence of the abnormality in the system. The determination value is stored in the data storage area 306 etc. When executing the process of S812, the controller 304 may determine whether the determination value varies beyond the certain amount by referring to the data of the stored determination values. A determination threshold in S812 may be set up arbitrarily or may be obtained from an external device. Moreover, the determination threshold in S812 may dynamically vary on the basis of statistical analysis of the data of the stored determination value.

When executing a process of "IMAGE OBTAINMENT" of S813, the controller 304 obtains the image that is a target to which the image process is applied. At this time, the controller 304 obtains the image data of the time (time of occurrence of the abnormality in the system) detected by the process of S812. Thereby, the controller 304 is able to obtain the image data of the time previous to the time of detecting the abnormality by executing the process of the flowchart "Flow1" as the image data of the time of occurrence of the abnormality.

A process of S814 corresponds to "DATA CODE READING" included in the parts list area 401 in FIG. 4. When executing the process of S814, the controller 304 reads a data code of the workpiece by applying the image process to the obtained image data. The data code may be a one-dimensional code, a two-dimensional code, or a combination pattern of characters and drawings, for example. A data-code reading method may be provided by the image processing library 309. For example, the controller 304 may perform a data-code reading process after extracting the data code using luminance information, color information, etc. The data code may be pasted on the workpiece or may be stamped on the workpiece.

When executing the "DETERMINATION PROCESS" of S815, the controller 304 determines whether the data code read by the process of S814 corresponds to the dictionary data or the workpiece type that are stored in the data storage area 306 or the RAM area of the memory unit 305. When the read data code does not correspond to the dictionary data or the workpiece type that are stored beforehand, the controller 304 recognizes that an abnormality occurs by the determination processing of S815. When reading of a data code fails in the process of S814, the controller 304 recognizes that an abnormality occurs by the determination process of S815 similarly. The process of S816 is identical to the process of S412 in FIG. 4. And the process of S817 is identical to the process of S407 in FIG. 4.

The flowchart "Flow5" of FIG. 8C describes the analysis process that inspects tilt of a workpiece. A process of S824 differs from the process of S814 of the flowchart "Flow2" of FIG. 8B among the processes of S821 through S827 of FIG. 8C. The processes other than S824 are identical to that of the flowchart "Flow2" of FIG. 8B. In the meantime, the process of "DETERMINATION CHANGE DETECTION" of S822 may be identical to the process of S812 of the flowchart "Flow2" of FIG. 8B or may be different from it. For example, the process of "DETERMINATION CHANGE DETECTION" of S822 may approximate the data of the stored determination values in a certain section to a straight line or a curve and may detect a time when a tilt of the straight line or the curve exceeds a predetermined value as a time of occurrence of the abnormality. The process of "DETERMINATION CHANGE DETECTION" of S822 may calculate a fluctuation of the data of the stored determination values as a standard deviation etc. by statistically processing the data and may detect a time when a deviation of a determination value from a reference value, which is a value of the fluctuation, exceeds a certain amount as a time of occurrence of the abnormality.

A process of S824 corresponds to "TILT INSPECTION" included in the parts list area 401 in FIG. 4. A tilt inspection method may be provided by the image processing library 309. When executing the process of S824, the controller 304 may extract the luminance gradient of the image and may calculate the tilt using an approximation straight line of the extracted luminance gradient. Moreover, when executing the process of S824, the controller 304 may perform pattern matching on the basis of predetermined characteristic feature information and may calculate the tilt using matching information that is a result of the pattern matching.

Figure 9:
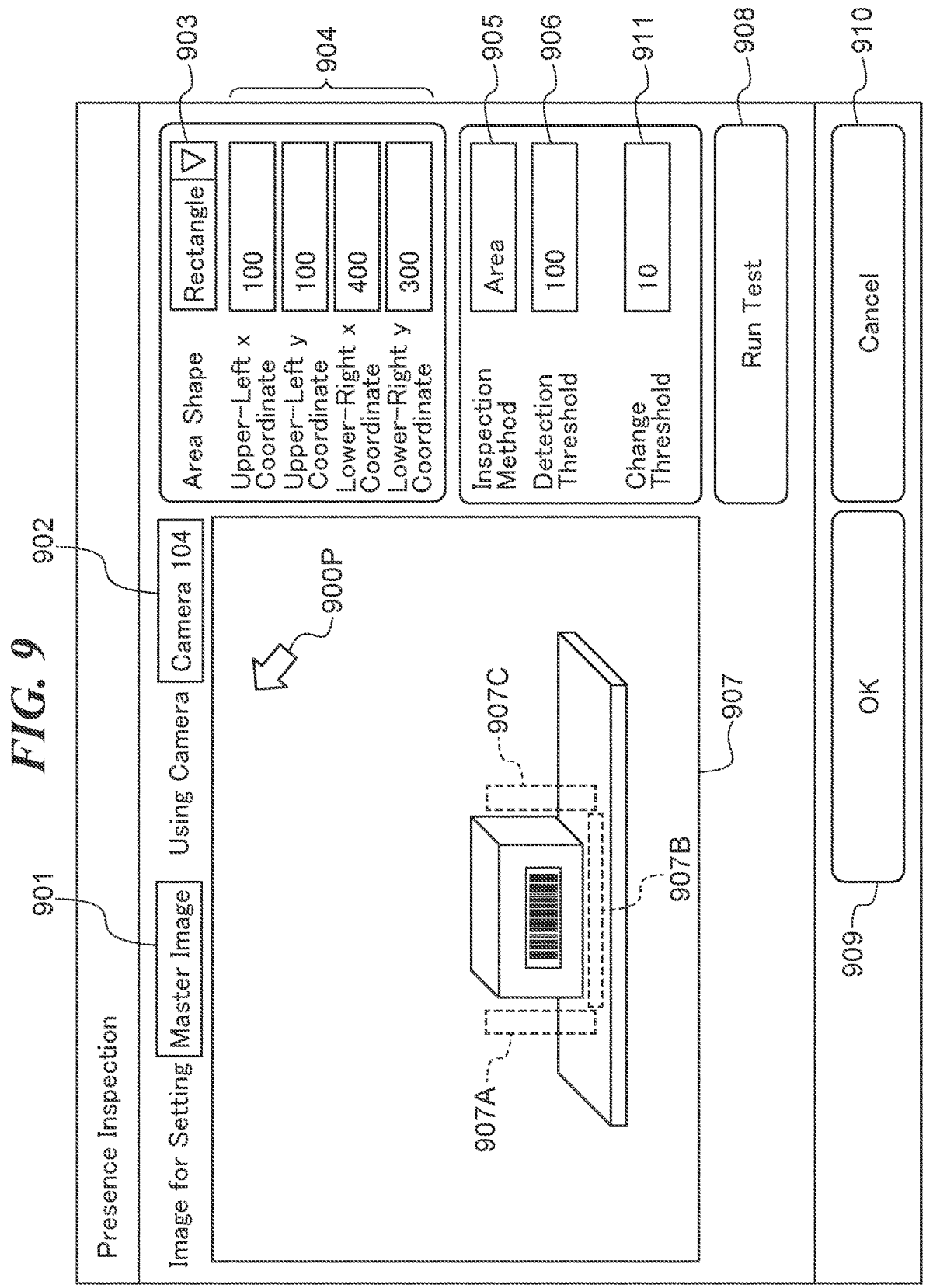
FIG. 9 is a view showing an example of a detail setting screen displayed on the display device of the image processing apparatus.

Next, the detailed setting screen will be described. FIG. 9 is a view showing an example of the detailed setting screen about the presence inspection process. The detailed setting screen corresponds to a third screen. The detailed setting screen is used to set up each of the processing parts listed in the parts list area 401. Moreover, the detailed setting screen may be dynamically generated depending on settable items. The detailed setting screen of FIG. 9 is a GUI for calculating a position and posture of a workpiece by an image processing method using the shade information and for inspecting presence of the workpiece. On the detailed setting screen of FIG. 9, a processing area subjected to a process of a corresponding processing part can be set. In the example of FIG. 9, the area in which presence of a workpiece is inspected is the processing area.

For example, the processing area is set about the process of "DATA CODE READING" of S814. In this case, the processing area is set around an area where a workpiece will be stacked on the service table 108. Moreover, the processing area is set about the process of "TILT INSPECTION" of S824. Since a target of the tilt inspection is a workpiece that is stacked on the service table 108 in the second or upper step from the bottom, the processing area is set around the workpiece that is stacked on the service table 108 in the second step from the bottom. Setting of the processing area is not limited to the examples mentioned above. Both the processing area subjected to the process of "DATA CODE READING" of S814 and the processing area subjected to the process of "TILT INSPECTION" of S824 differ from the monitoring areas 502.

A selection item 901 on the detailed setting screen of FIG. 9 is a list item for selecting an image. When a user presses the selection item 901 by using the mouse, the controller 304 displays file names of the images stored in the memory unit 305 and the character string of "camera image" as a pulldown menu of a list form. Although a file name of an image is information that specifies the image, the information that specifies an image is not limited to a file name.

When the user gives an operation to select a file name of a desired image from the displayed list, the controller 304 registers the image corresponding to the selected file name as a setting image used for setting. In the example of FIG. 9, the image corresponding to the file name "Master Image" is selected as the setting image. A setting item 902 is used to specify the camera to photograph. The example of FIG. 9 shows that the camera 104 photographs.

The setting image is displayed in an image display area 907. In the detailed setting screen of FIG. 9, a setting item 903 is used to set a shape of an area. In the setting item 903, the shape of the area is selectable from among a rectangle, a circle, an ellipse, a ring, etc. In the example of FIG. 9, choices are suggested by displaying a pulldown menu in a list form. The shape of the area is set according to a user operation to the pulldown menu. The shape of the area may be formed by combining some of the above-mentioned shapes or may be formed by adding or excepting a predetermined area. Moreover, the shape of the area may be freely set by a user by drawing the area using the mouse.

FIG. 9 shows a setting example of rectangular areas 907A, 907B, and 907C. The rectangular areas 907A, 907B, and 907C are identical to the monitoring areas 502 mentioned above. As shown in FIG. 9, the rectangular area 907A and the rectangular area 907C have the same height. The rectangular area 907B connects the rectangular area 907A and the rectangular area 907C. Setting items 904 are used to set one rectangular area in an xy coordinate system of the setting image (image data). Numerical values of the x-coordinate and y-coordinate of the upper left corner of the rectangular area and numerical values of the x-coordinate and y-coordinate of the lower right corner of the rectangular area are entered into the setting items 904. When the user operates to enter the numerical values of the respective coordinates into the setting items 904, one rectangular area is set on the basis of the entered numerical values. In an applied image coordinate system, origin is the left upper corner of the image data, a horizontal direction is represented by an x-axis, and a vertical direction is represented by a y-axis.

The numerical values of the coordinates in the setting items 904 may be adjusted by press operations to a count-up button and countdown button instead of direct entry of numerical values. When one rectangular area has been set, the controller 304 displays the set rectangular area superimposed on the image data of the setting image that is currently displayed on the image display area 907. Thereby, the user is able to set the rectangular areas 907A, 907B, and 907C while visually recognizing the setting image in the image display area 907.

Next, setting about the workpiece presence inspection will be described. A setting item 905 is used to set up an inspection method. The example of FIG. 9 shows that the workpiece presence inspection is performed according to "Area". The controller 304 is able to detect the area of the workpiece by applying the image process to the image data that is currently displayed in the image display area 907. A setting item 906 is used to set a detection threshold that is used to determine whether a workpiece is in a concave section surrounded by the rectangular areas 907A, 907B, and 907C. In the example of FIG. 9, the detection threshold is an absolute value of the area of the workpiece that enters into a rectangular area. The detection threshold may be a ratio of the area of the workpiece to the section. The area of the workpiece found by the image processing may be detected on the basis of the area of pixels that fall within a specific shade range or a color density range, for example. Moreover, a setting item 911 is used to set a change threshold that is used to detect a change amount of a predetermined determination value (area of the workpiece that enters into a rectangular area). The details of the setting item 911 will be mentioned later.

A test running button 908 is used to perform test photographing. When the user presses the test running button 908, the controller 304 controls the camera 104 that is registered in the setting item 902 to photograph. The using camera designated by the setting item 902 may be registered beforehand and can be switched. When the image processing apparatus 101 obtains the image picked up with the camera 104, the controller 304 detects the workpiece inside the section surrounded by the rectangular areas 907A, 907B, and 907C. Thereby, the controller 304 is able to inspect the existence of the workpiece on the basis of whether the area of the workpiece that enters into a rectangular area is more than the detection threshold.

The OK button 909 is used to save the various settings mentioned above. When the user presses the OK button 909, the controller 304 stores the information set to the setting items while associating with the image processing program 307 into the memory unit 305. The controller 304 reads the information set to the setting items stored in the memory unit 305 when the image processing program 307 is executed or when the setting items are set again. A cancel button 910 is used to cancel the information set to the setting items. When the user presses the Cancel button 910, the controller 304 cancels the information set to the setting items.

As mentioned above, the controller 304 generates a plurality of flowcharts on the basis of the contents created on the flowchart creation screen. Moreover, the controller 304 generates a flowchart that monitors occurrence of an abnormality in the system and generates a plurality of flowcharts that are executed when occurrence of an abnormality is detected on the basis of the contents set on the operation setting screen. Then, the controller 304 generates the image processing program 307 that is constituted by the various flowcharts mentioned above. Then, the controller 304 performs the monitoring process for detecting an abnormality and the analysis process for analyzing a cause of an abnormality by running the image processing program 307.

Next, the monitoring of occurrence of an abnormality in the system will be described FIG. 10 is a view showing a plurality of frames and images for detecting an abnormality. Frames 1 through 6 in FIG. 10 show the frames (image data) picked up with the camera 104 in time series. FIG. 10 shows an example in which abnormality detection is performed according to the flowchart "Flow1" mentioned above. The number of frames are not limited to six. Each frame is stored in the memory unit 305 etc. The monitoring areas 502 mentioned above are indicated by broken lines in each frame. The monitoring areas 502 correspond to the rectangular areas 907A, 907B, and 907C in FIG. 9.

The frame 1 shows a state where a workpiece is stacked on the service table 108 by the end effector of the robot 105. When the controller 304 that is executing the process of the flowchart "Flow1" shown in FIG. 8A executes the process of S803, the controller 304 extracts the area of the workpiece that enters into a monitoring area 502 and determines whether the extracted area is more than the detection threshold. In the example of FIG. 9, the detection threshold is set to "100". In the frame 1, the area of the workpiece that enters into a monitoring area 502 is "0". Accordingly, since the area of the workpiece that enters into the monitoring area 502 is equal to or less than the detection threshold, the controller 304 determines that the system is normal.

In the frames 2 through 5, the end effector of the robot 105 is retracted. The controller 304 determines whether an abnormality occurs in the system by executing the process of the flowchart "Flow1". In the description, the stacking position of the workpiece that is stacked on the service table 108 in the second step from the bottom shall not be proper and the tilt shall become larger gradually. Thereby, the area of the workpiece (the workpiece in the second step from the bottom) that enters into the monitoring area 502 becomes larger gradually after the frame 2. In the frames 2 through 5, the areas of the workpiece that enters into the monitoring area 502 are "7", "20", "25", and "60", respectively. Accordingly, since the area of the workpiece that enters into the monitoring area 502 is less than the detection threshold, the controller 304 determines that the system is normal. In the frame 6, the area of the workpiece that enters into the monitoring area 502 is "110". Accordingly, since the area of the workpiece that enters into the monitoring area 502 is equal to or more than the detection threshold, the controller 304 determines that the abnormality occurs in the system.

In the description, the controller 304 detects an abnormality by executing the process of the flowchart "Flow1" in the frame 6. However, the time of occurrence of the abnormality may be prior to the time of the frame 6. Accordingly, the analysis process is executed to the image of the time before the time at which the abnormality is detected by executing the process of the flowchart "Howl" in order to analyze the cause of the abnormality.

The determination change detection is performed in S812 in "Flow2" of FIG. 8B and S822 in "Flow5" of FIG. 8C. In the setting item 911 in FIG. 9, the change threshold of the determination value is set to "10". In this case, the controller 304 detects a time point at which the change amount of the area of the workpiece that is entered into the monitoring area 502 between adjacent frames becomes equal to or more than the change threshold "10" as a change point (a time at which an abnormality starts to occur). In the example of FIG. 10, the change amount of the area of the workpiece that enters into the monitoring area 502 becomes "13" at the time point of the frame 3 and is larger than the change threshold. In this case, the controller 304 detects that the abnormality starts to occur in the system at the time point of the frame 3.

The controller 304 may thin out frames to which the process of the flowchart "Flow1" is executed. For example, the controller 304 thins out the odd-numbered frames and may execute the process of the flowchart "Flow1" to the frame of the even-numbered frames. Thereby, the processing load is reduced.

Moreover, the controller 304 may thin out frames, when executing the process of the determination change detection in S812 and S822. For example, when the odd-numbered frames are thinned out, the controller 304 may detect that the abnormality starts to occur in the system at the time point at which the change amount between adjacent even-numbered frames becomes equal to or more than the change threshold. In this case, the controller 304 detects that the abnormality starts to occur in the system at the time point of the frame 4. Moreover, when the controller 304 thins out frames and detects that the abnormality starts to occur in the system, the processes of S812 and S822 may be executed to the odd-numbered frames that are thinned out and are not processed. In this case, the controller 304 detects that the abnormality starts to occur in the system at the time point of the frame 3. That is, the processes of S812 and S822 are executed to the unprocessed frames after the controller 304 detects that the abnormality starts to occur in the system. Accordingly, the processing load is reduced, and precise abnormality detection can be performed.

Figure 11A:
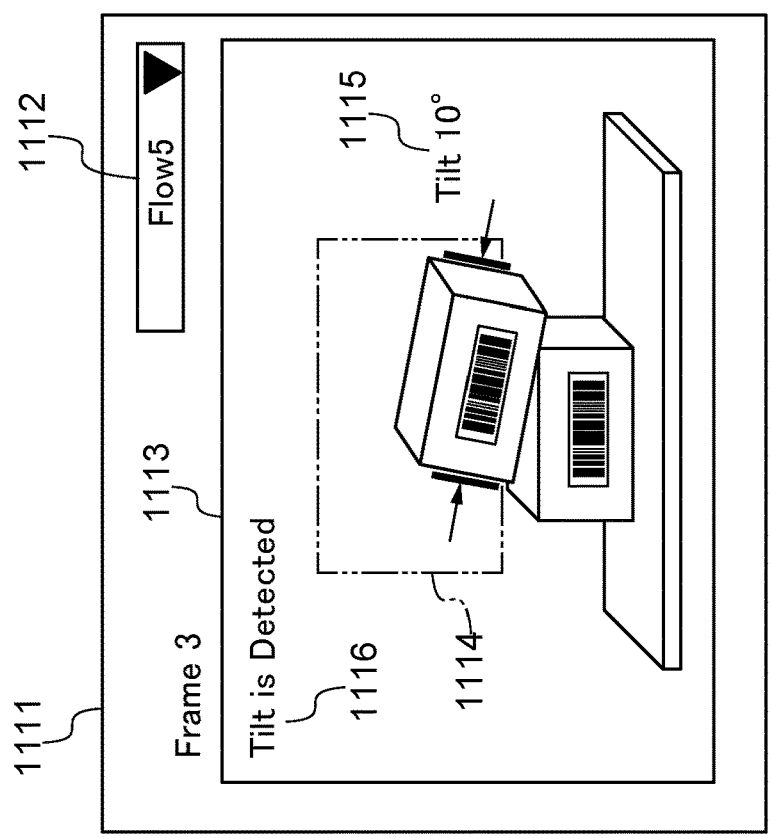
FIG. 11A and FIG. 11B are views showing screen examples that indicate results of an analysis process executed by the image processing apparatus.
Figure 11B:
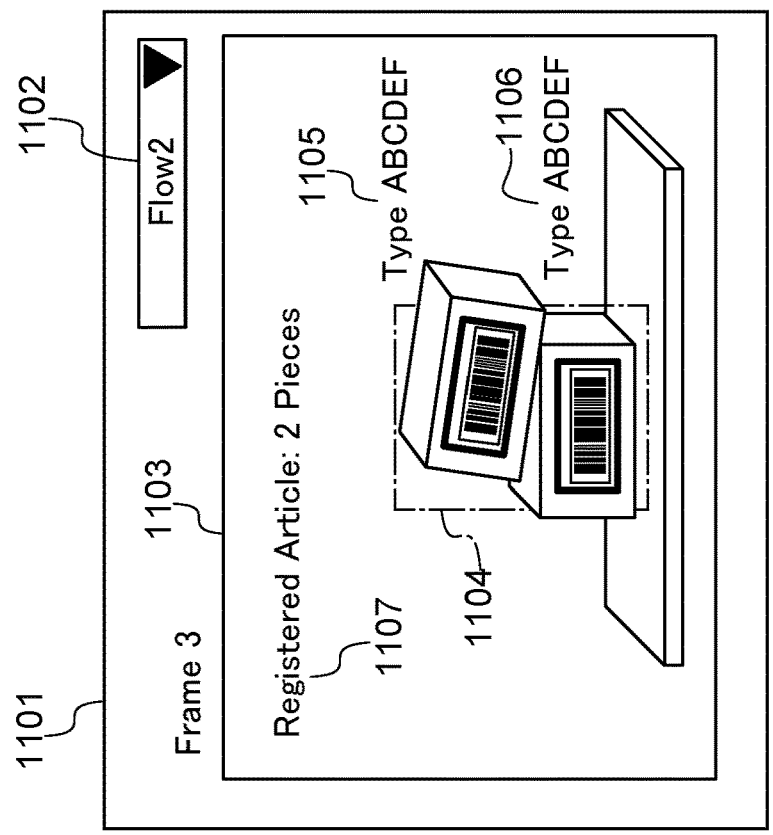

As mentioned above, when the abnormality is detected, the controller 304 executes the analysis processes of the flowcharts "Flow2" and "Flow5" to analyze the cause of the detected abnormality. FIG. 11A and FIG. 11B are views showing screen examples that indicate execution results of the analysis processes. In this description, the controller 304 shall detect that the abnormality starts to occur in the system at the time point of the frame 3. A result display screen 1101 of FIG. 11A is displayed on the display device 301 when the controller 304 executes the process of the flowchart "Flow2". A result display screen 1111 of FIG. 11B is displayed on the display device 301 when the controller 304 executes the process of the flowchart "Flow5".

The controller 304 may display the result display screens 1101 and 1111 when detecting that the abnormality starts to occur. Moreover, the controller 304 may display the result display screens 1101 and 1111 when a user presses a specific button on an operation screen, or a processing part listed in the parts list area 401. The result display screen 1101 will be described first. The result display screen 1101 includes a selection item 1102. The selection item 1102 is used to switch the flowchart. In the examples of FIG. 11A and FIG. 11B, the flowchart is switchable in a pull down menu form. That is, the result display screen 1101 and the result display screen 1111 are switchable.

Since "Flow2" is selected in FIG. 11A, the execution result of the process of the flowchart "Flow2" is displayed on the result display screen 1101. A frame is displayed in an image display area 1103. The frame 3 is displayed in the example of FIG. 11A. A processing area 1104 indicated by an alternate long and short dash line in the image display area 1103 is set as an area in which a stacking operation of a workpiece is performed. It is a different area from the monitoring areas 502. The flowchart "Flow2" includes the process of "DATA CODE READING" of S814. The controller 304 displays data-code reading results 1105 and 1106 on the result display screen 1101 by executing the process of DATA CODE READING". At this time, the controller 304 inquires the detected data code of a registered article list that is registered beforehand, counts registered articles, and displays a count result 1107 in the image display area 1103. For example, when an unregistered article is mixed as a workpiece, size and weight of the workpiece may differ from that of the other workpiece, which may become a cause of collapse. The controller 304 performs the analysis process by executing the process of the flowchart "Flow2" and notifies the user of mixture of the unregistered article that causes an abnormality by displaying the number of registered articles as shown in FIG. 11A.

Since "Flow5" is selected in FIG. 11B, the execution result of the process of the flowchart "Flow5" is displayed on the result display screen 1111. Descriptions about parts that are the same as FIG. 11A are omitted. A processing area 1114 is indicated by an alternate long and two short dashes line in the image display area 1113. The processing area 114 is set at positions of workpieces in the second and upper steps from the bottom among the workpieces that are stacked on the service table 108. The processing area 114 is a different area from the monitoring areas 502. The flowchart "Flow5" includes the process of "TILT INSPECTION" of S824. The controller 304 displays a detection result of the tilt of the workpiece on the result display screen 1111 numerically by executing the process of "TILT INSPECTION". At this time, the controller 304 may determine that the tilt occurs when the detected tilt is out of a range of an allowed tilt registered beforehand. For example, when grip of a workpiece by the robot 105 or a control action of the robot 105 is unstable or inaccurate, the workpiece stacked on the service table 108 may become unstable, which may cause collapse, collision, falling, etc. The controller 304 performs the analysis process by executing the process of the flowchart "Flow5" and displays the tilt of the workpiece that causes an abnormality as shown in FIG. 11B.

Moreover, the controller 304 may execute the above-mentioned analysis process to not only the frame 3 in which the abnormality is detected but also frames preceding and following the frame 3. Thereby, an abnormality occurrence tendency is analyzable.

Figure 12:
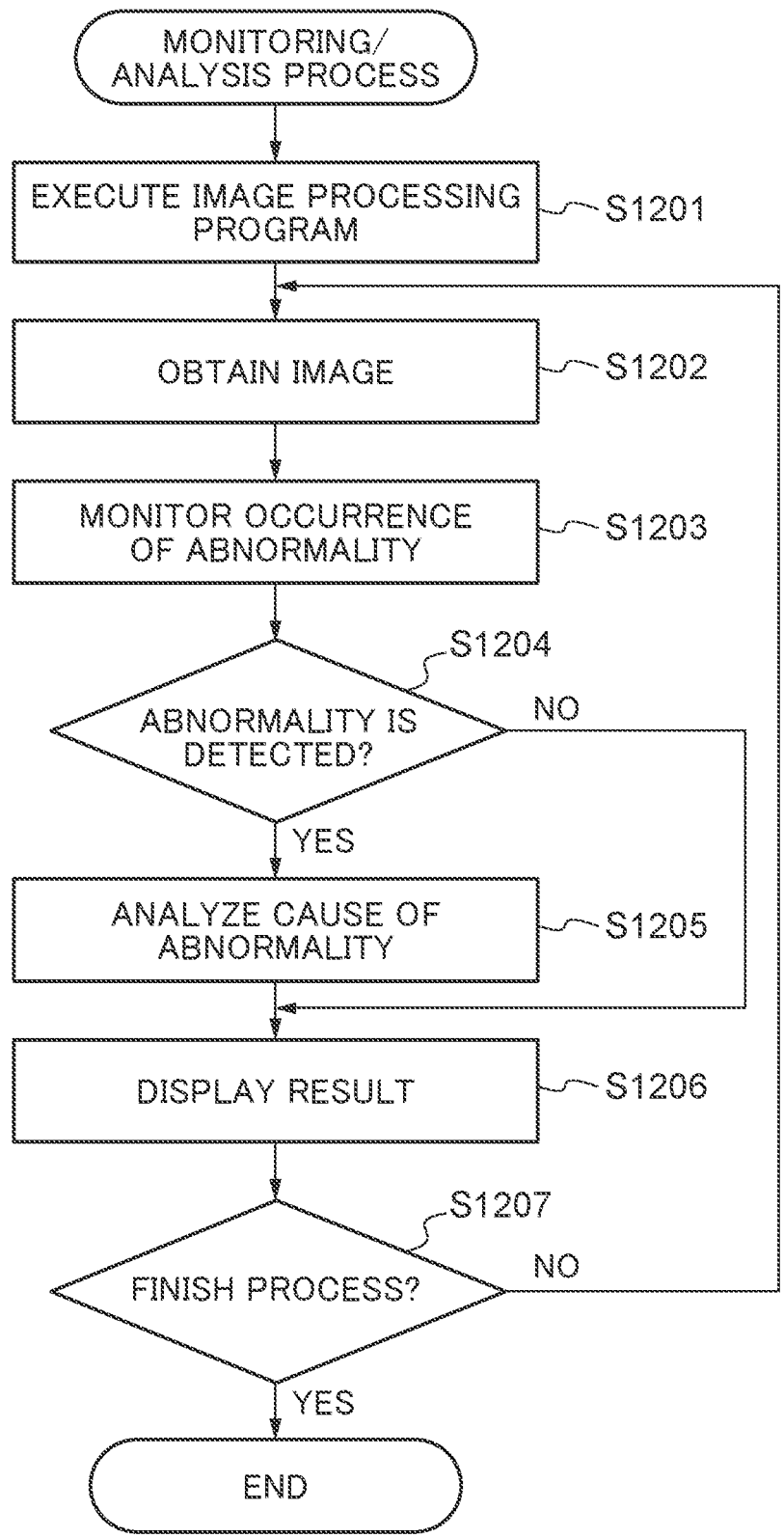
FIG. 12 is a flowchart showing a flow of the monitoring process and analysis process that are executed by the image processing apparatus.

Next, the entire flow of the monitoring process and analysis process will be described. FIG. 12 is a flowchart showing the flow of the monitoring process and analysis process. The controller 304 generates each flowchart on the basis of the contents set up by the flowchart creation screen, operation setting screen, and detailed setting screen mentioned above. The controller 304 generates the image processing program 307 that is constituted by flowcharts and stores it to the memory unit 305.

Then, the controller 304 reads the image processing program 307 from the memory unit 305 and runs it in S1201. In S1202, the controller 304 obtains images from the memory unit 305. In S1203, the controller 304 determines whether an abnormality occurs in the system by executing the process of the above-mentioned flowchart "Flow1". In S1204, the controller 304 determines whether an abnormality is detected. When determining to be YES in S1204, the controller 304 proceeds with the process to S1205. In S1205, the controller 304 analyzes the cause of the abnormality. At this time, the controller 304 analyzes the cause of the abnormality by executing the processes of the flowcharts "Flow2" and "Flow5" mentioned above, for example. When determining to be NO in S1204, the controller 304 proceeds with the process to S1206. In S1206, the controller 304 displays the result display screen as shown in FIG. 11A or FIG. 11B. In S1207, the controller 304 determines whether to finish the process of FIG. 12. The controller 304 may determine to finish the process when a predetermined finish condition is satisfied, for example. When determining to be NO in S1207, the controller 304 returns the flow to S1202. When determining to be YES in S1207, the controller 304 finishes the process of FIG. 12.

As mentioned above, in this embodiment, the image processing apparatus regularly monitors the status of the system by applying the image process in the specific image area during operation of the system. Then, when detecting an abnormality, the image processing apparatus applies the image process to another image area in image data of the time at which the abnormality occurred. Thereby, the cause of occurrence of the abnormality is analyzable in high accuracy.

Moreover, the flowchart for monitoring an abnormality and the flowchart for analyzing a cause of an abnormality are associated. Thereby, the monitoring of an abnormality can be always performed, and a plurality of complicated analysis processes can be performed when an abnormality is detected. Accordingly, the regular processing load of the system is reduced.

Moreover, since images preceding and following the timing at which an abnormality occurred can be referred to quickly, later countermeasures can be implemented quickly. Furthermore, which of the analysis processes is executed is settable according to a detection content and detection time. Thereby, the cause of the abnormality is analyzable according to the more important detection content even by the image processing apparatus having small data storage capacity. Accordingly, in this embodiment, the cause of the abnormality of the system is efficiently analyzable. Accordingly, the user is able to restore of the system and perform maintenance efficiently.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-075402, filed Apr. 21, 2020, which is hereby incorporated by reference herein in its entirety.

What is claimed is:

1. An apparatus comprising:
one or more processors; and
at least one memory coupled to the one or more processors storing instructions that, when executed by the one or more processors, cause the one or more processors to function as:
a monitoring unit configured to monitor an object to detect occurrence of an abnormality in the object by applying an image process to a first area in each of images of the object that are photographed at different time points; and
an analysis unit configured to analyze a cause of an abnormality detected by the monitoring unit by applying an image process to a second area in an image of a time point preceding a time point at which the abnormality is detected,
wherein a first flowchart about an image process that monitors the object to detect occurrence of an abnormality and second flowcharts about image processes that analyze a cause of an abnormality are created by user operations.

2. The apparatus according to claim 1, wherein a size of the first area depends on a time at which the object is photographed.

3. The apparatus according to claim 1, wherein at least one parameter of the image process to the first area depends on a time at which the object is photographed.

4. The apparatus according to claim 1, wherein an image process corresponding to one of the second flowcharts that is not accompanied by system stop is executed.

5. The apparatus according to claim 1, wherein an image process of one of the second flowcharts that is executed is selected according to an execution result of the image process of the first flowchart.

6. The apparatus according to claim 1, wherein the first flowchart and the second flowcharts are settable with associating with each other on one screen.

7. The apparatus according to claim 1, wherein screens that respectively show execution results of the image processes of the second flowcharts are switchable.

8. The apparatus according to claim 1, wherein the monitoring unit obtains images of a time when a predetermined determination value, which is used to detect occurrence of an abnormality, varies beyond a certain amount as images of times preceding the time at which the abnormality is detected.

9. The apparatus according to claim 8, wherein the monitoring unit thins out and obtains the images.

10. The apparatus according to claim 1, wherein the object is a workpiece operated by a robot.

11. A method for an apparatus, the method comprising:
monitoring an object to detect occurrence of an abnormality in the object by applying an image process to a first area in each of images of the object that are photographed at different time points; and
analyzing a cause of an abnormality detected by the monitoring by applying an image process to a second area in an image of a time point preceding a time point at which the abnormality is detected,
wherein a first flowchart about an image process that monitors the object to detect occurrence of an abnormality and second flowcharts about image processes that analyze a cause of an abnormality are created by user operations.

12. The method according to claim 11,
wherein a size of the first area depends on a time at which the object is photographed, and
wherein at least one parameter of the image process to the first area depends on a time at which the object is photographed.

13. The method according to claim 11, wherein an image process of one of the second flowcharts that is executed is selected according to an execution result of the image process of the first flowchart.

14. The method according to claim 11, wherein the first flowchart and the second flowcharts are settable with associating with each other on one screen.

15. The method according to claim 11, wherein screens that respectively show execution results of the image processes of the second flowcharts are switchable.

16. A non-transitory computer-readable storage medium storing a control program causing a computer to execute a method for an apparatus, the method comprising:
monitoring an object to detect occurrence of an abnormality in the object by applying an image process to a first area in each of images of the object that are photographed at different time points; and
analyzing a cause of an abnormality detected by the monitoring by applying an image process to a second 
area in an image of a time point preceding a time point at which the abnormality is detected,
wherein a first flowchart about an image process that monitors the object to detect occurrence of an abnormality and second flowcharts about image processes that analyze a cause of an abnormality are created by user operations.

17. The non-transitory computer-readable storage medium according to claim 16,
wherein a size of the first area depends on a time at which the object is photographed, and wherein at least one parameter of the image process to the first area depends on a time at which the object is photographed.

18. The non-transitory computer-readable storage medium according to claim 16, wherein an image process of one of the second flowcharts that is executed is selected according to an execution result of the image process of the first flowchart.

19. The non-transitory computer-readable storage medium according to claim 16, wherein the first flowchart and the second flowcharts are settable with associating with each other on one screen.

20. The non-transitory computer-readable storage medium according to claim 16, wherein screens that respectively show execution results of the image processes of the second flowcharts are switchable.

\* \* \* \* \*